(12) United States Patent
Kibler et al.

(10) Patent No.: US 12,043,327 B2
(45) Date of Patent: Jul. 23, 2024

(54) METHOD AND APPARATUS FOR ADJUSTING TRAILER KING PIN LOCATION

(71) Applicant: MAC TRAILER MANUFACTURING, INC., Alliance, OH (US)

(72) Inventors: Scott A. Kibler, Kensington, OH (US); Allen Gordon, Canfield, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 503 days.

(21) Appl. No.: 17/238,915

(22) Filed: Apr. 23, 2021

(65) Prior Publication Data

US 2022/0153362 A1    May 19, 2022

Related U.S. Application Data

(60) Provisional application No. 63/115,703, filed on Nov. 19, 2020.

(51) Int. Cl.
*B62D 53/08* (2006.01)
*B62D 53/06* (2006.01)

(52) U.S. Cl.
CPC ....... *B62D 53/0807* (2013.01); *B62D 53/068* (2013.01); *B62D 53/0842* (2013.01)

(58) Field of Classification Search
CPC .............. B62D 53/0807; B62D 53/068; B62D 53/0842
See application file for complete search history.

(56) References Cited

U.S. PATENT DOCUMENTS

| | | | | |
|---|---|---|---|---|
| 5,476,277 A | * | 12/1995 | Schueman | B60G 5/005 180/209 |
| 7,207,587 B1 | * | 4/2007 | Wall | B62D 53/0842 280/425.2 |
| 7,712,761 B2 | * | 5/2010 | Mater, Jr | B60D 1/50 280/441 |
| 8,348,298 B2 | * | 1/2013 | Alguera | B62D 53/0814 280/441 |
| 2007/0017715 A1 | * | 1/2007 | McCann | B60G 17/0523 180/290 |
| 2009/0134601 A1 | * | 5/2009 | Wilkens | B62D 53/0871 280/488 |

* cited by examiner

*Primary Examiner* — Minnah L Seoh
*Assistant Examiner* — Marlon A Arce
(74) *Attorney, Agent, or Firm* — Sand, Sebolt & Wernow Co., LPA

(57) ABSTRACT

An adjustable trailer hitch and king pin assembly that may be moved longitudinally to adjust the position and weight distribution of a trailer relative to a truck. The disclosed assembly may allow a trailer to be utilized with various different sized and configured trucks while maximizing the cargo carrying capability and efficiency thereof. In one example, an adjustable trailer hitch is provided having a slidable king pin assembly that may be adjusted forwards or backwards to move the king pin to the desired location relative to the truck and trailer. In another example, a removable king pin may be provided that may be removed and moved to a different location according to the weight and desired weight distribution of a truck and trailer combination.

16 Claims, 26 Drawing Sheets

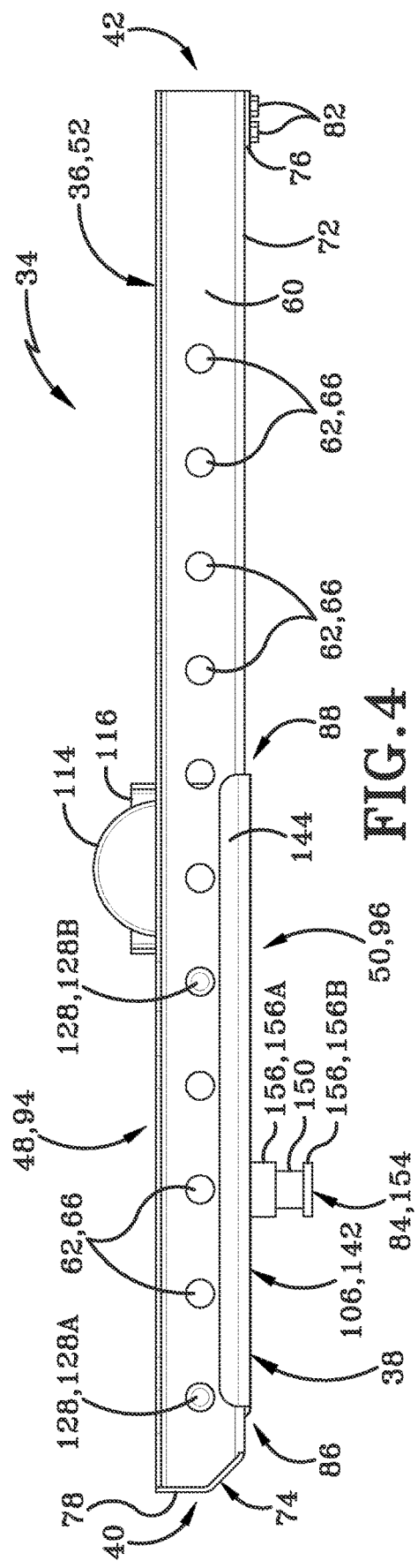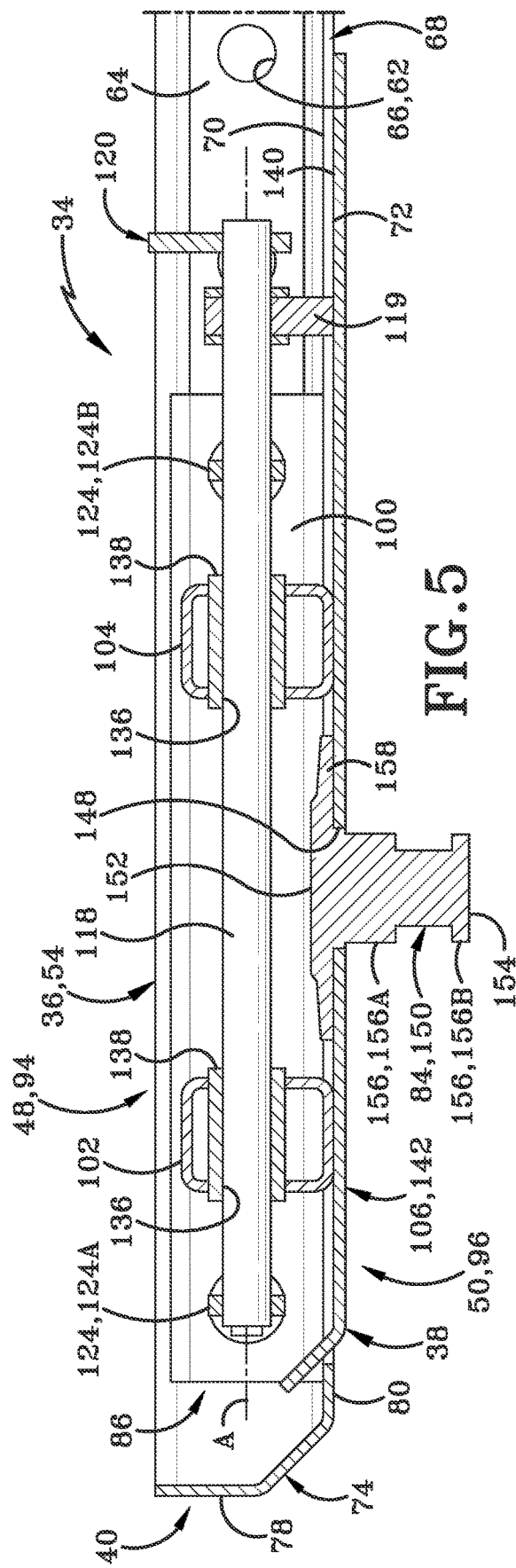

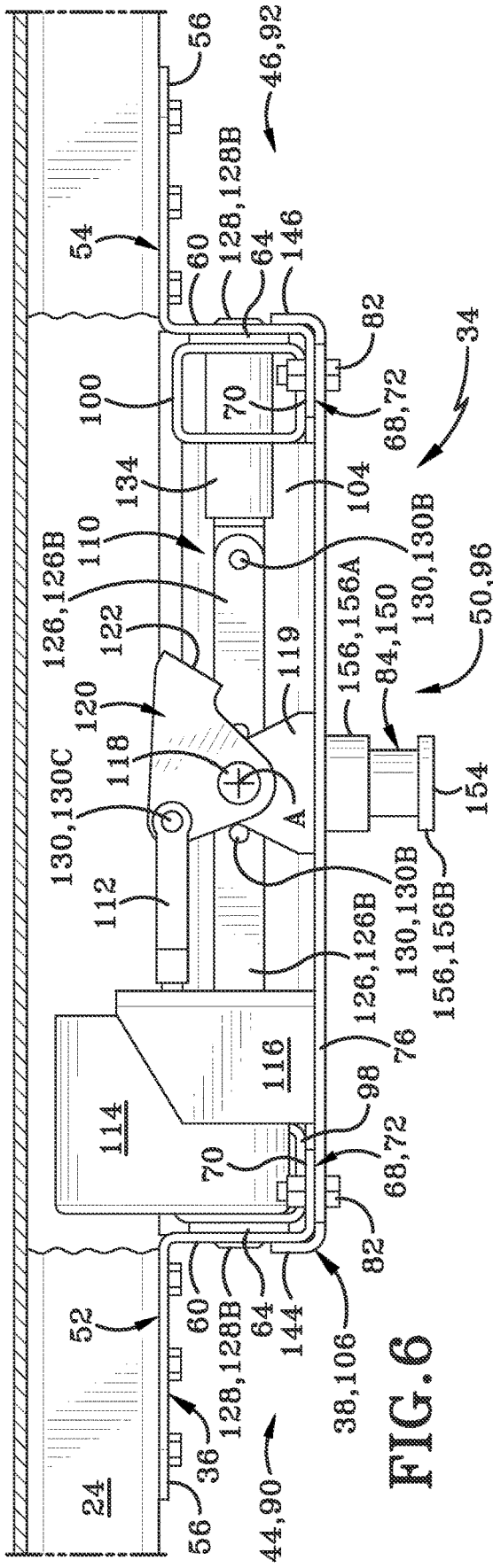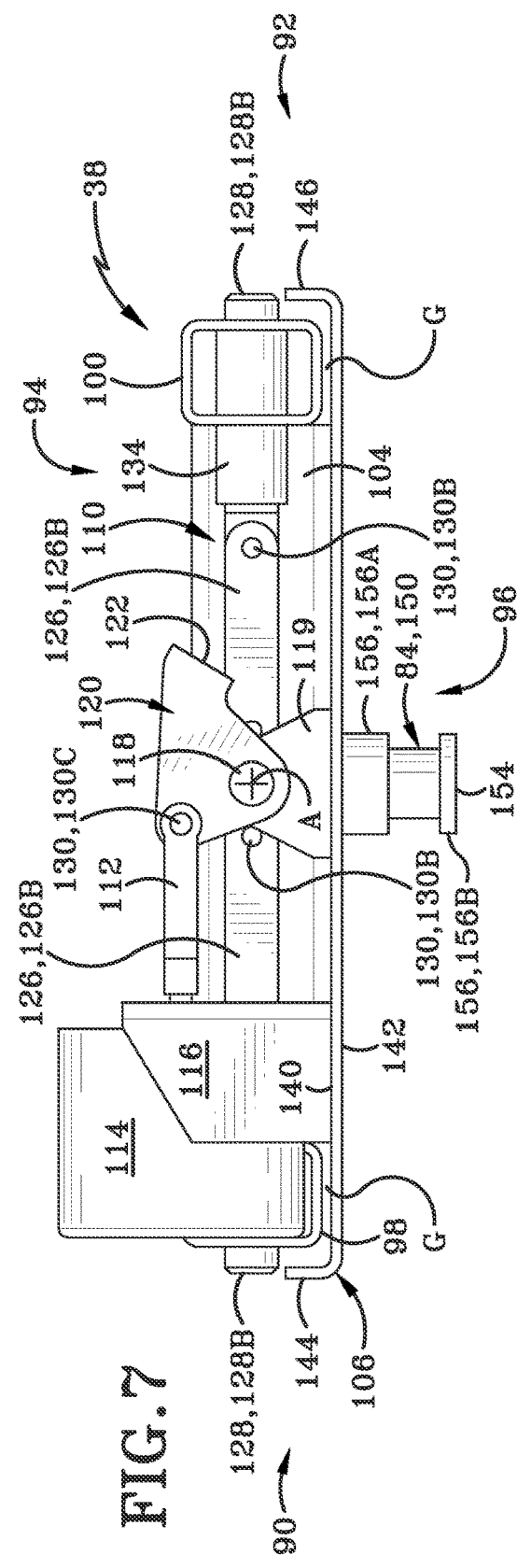

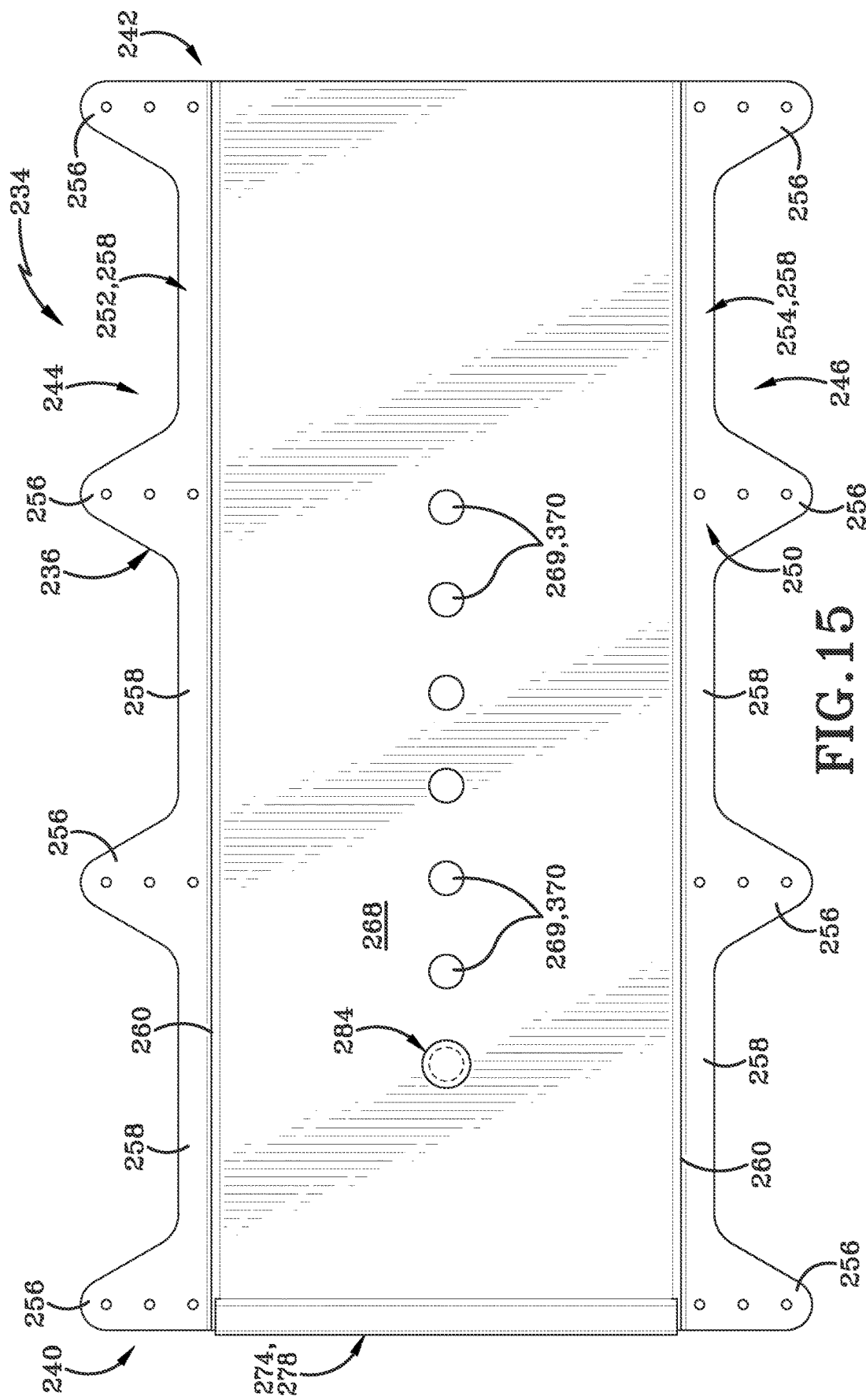

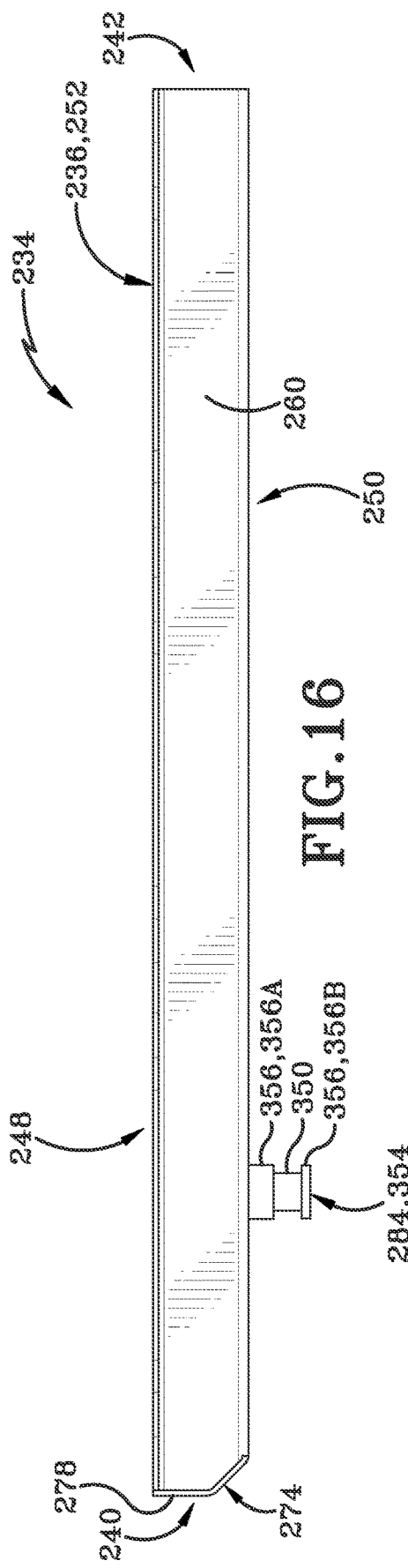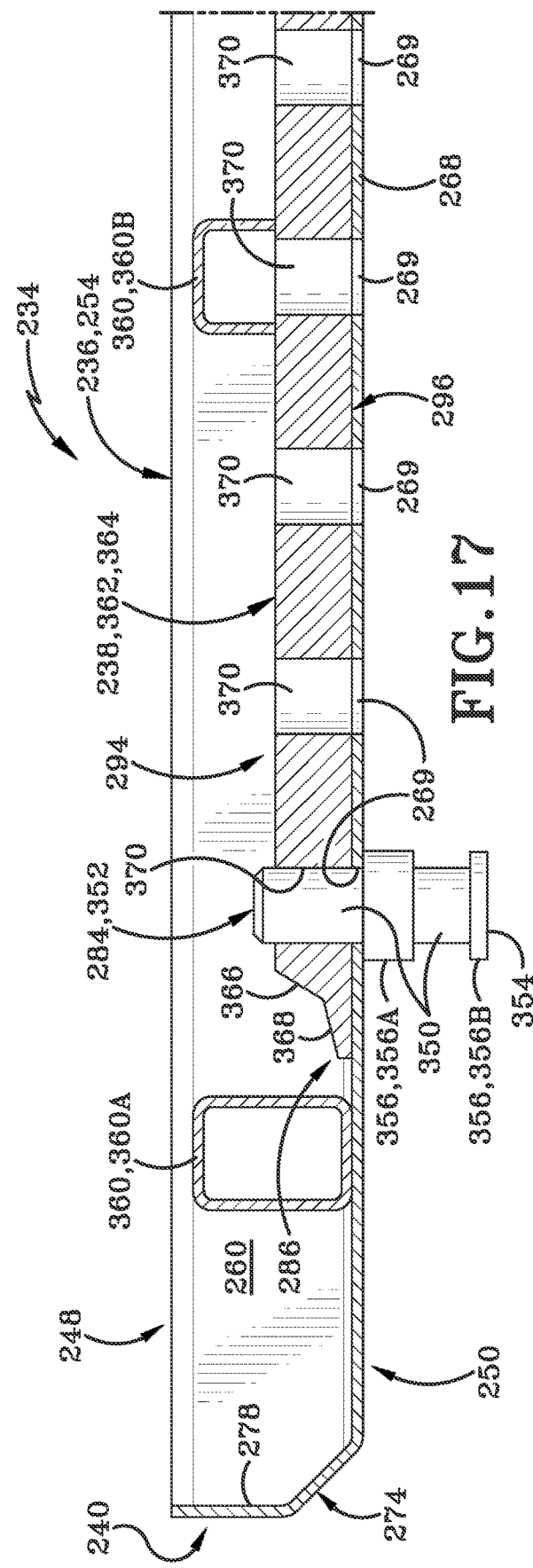

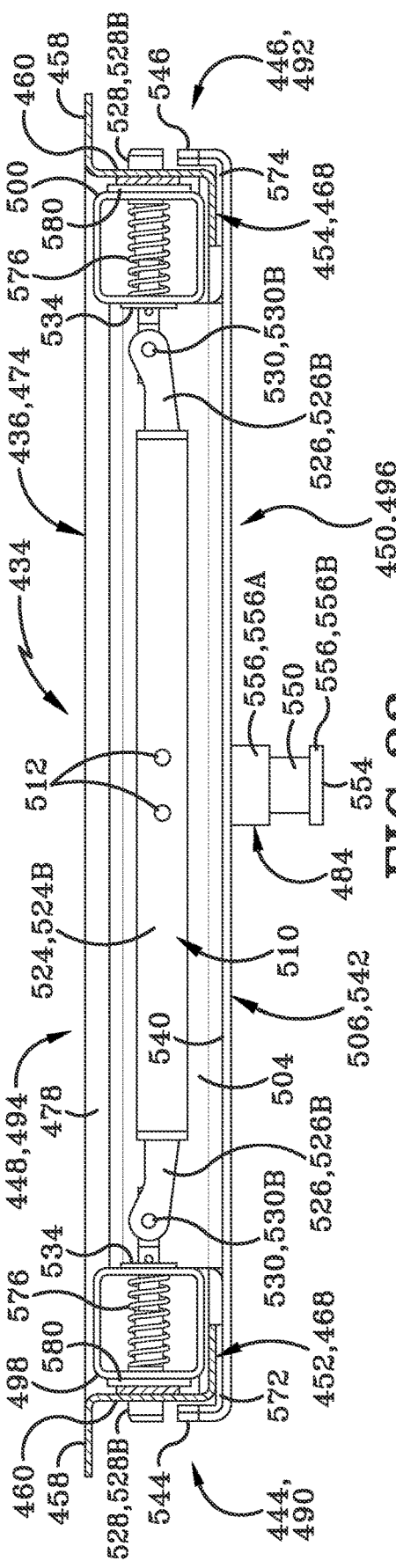
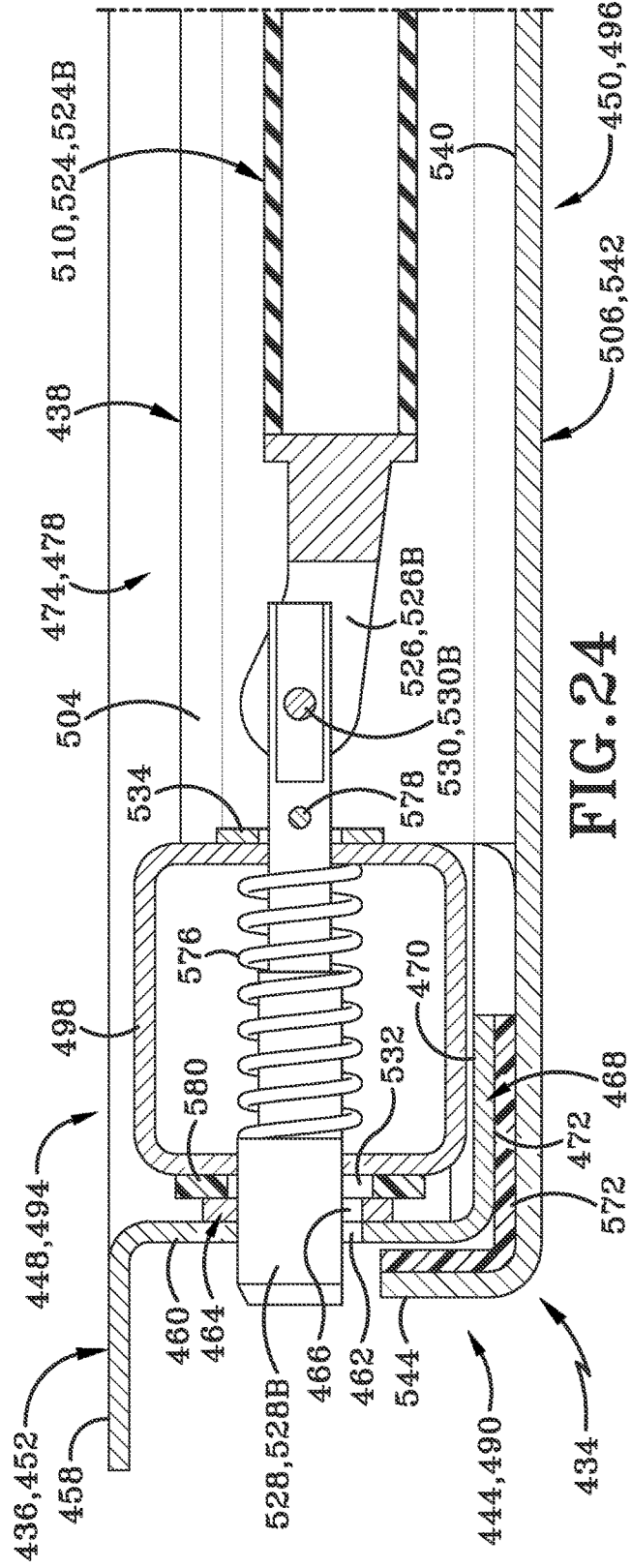
FIG. 23
FIG. 24

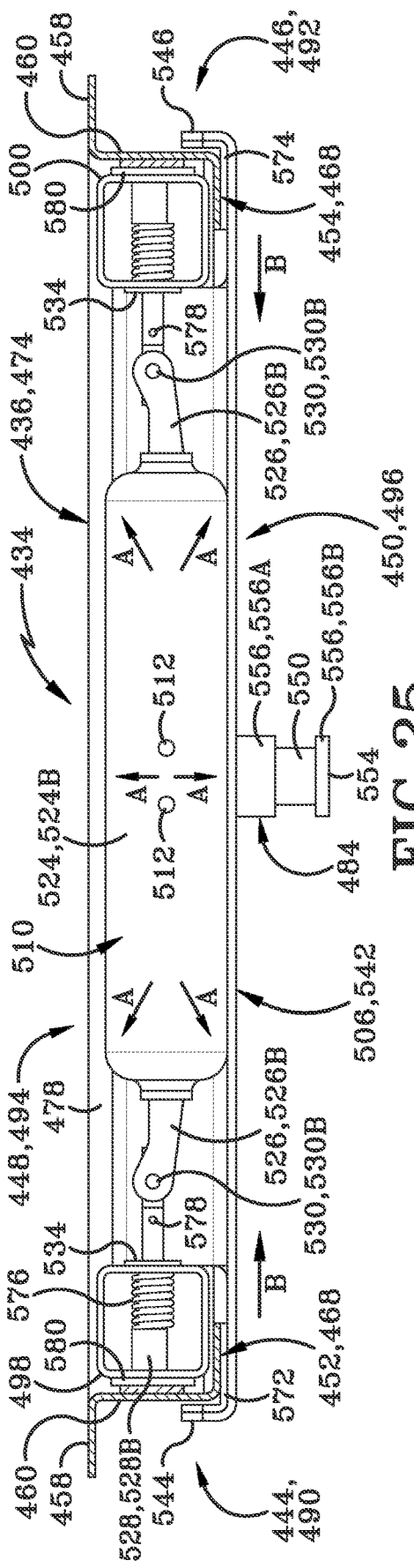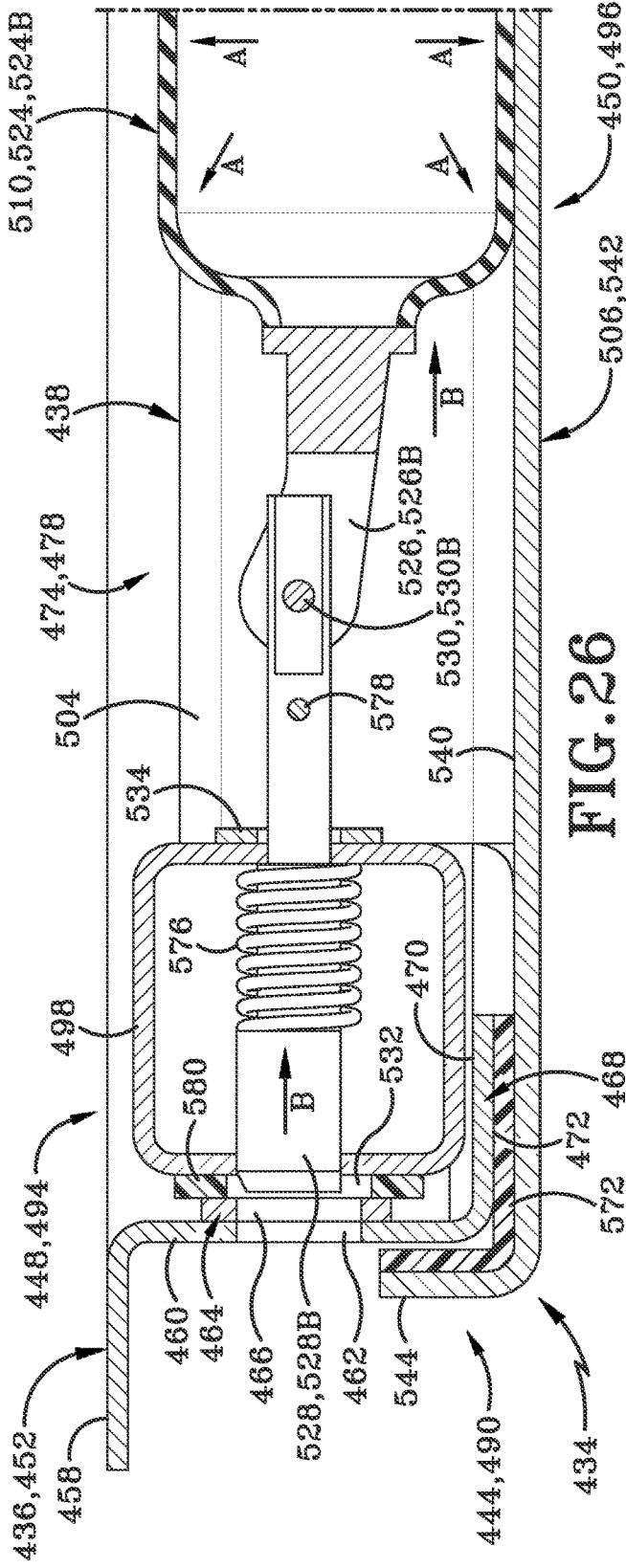

METHOD AND APPARATUS FOR ADJUSTING TRAILER KING PIN LOCATION

CROSS REFERENCE TO RELATED APPLICATIONS

This application claims the benefit of U.S. Provisional Application Ser. No. 63/115,703, filed on Nov. 19, 2020; the disclosure of which is incorporated herein by reference.

TECHNICAL FIELD

The present disclosure relates to an adjustable trailer king pin for use with a fifth wheel hitch system. More particularly, in one example, the present disclosure relates to an adjustable king pin assembly that allows the king pin of a trailer to be moved longitudinally forwards or backwards to adjust the mounting position of the king pin relative to the trailer. Specifically, in another example, the present disclosure relates to an adjustable king pin assembly that allows the weight of the front end of a trailer to be distributed differently on the axles of an associated truck to maximize the trailer size and weight based on the type of truck being used to tow the trailer.

BACKGROUND

The maximum allowable weight for a truck and trailer combination is determined by a number of factors including federal regulation, the weight of the truck, the weight of the trailer, and the number of axles and wheels on the truck and trailer combination. For example, federal limits issued by the Federal Highway Administration and/or the Department of Transportation indicate that a gross vehicle weight of 80,000 pounds may traverse on federal highways with 20,000 pounds permitted on any one single axle and a maximum of 34,000 pounds on any tandem axle group. This 80,000 pound maximum weight includes the weight of the truck, the weight of the trailer, and the weight of any cargo within that trailer. Other lower weight limits are prescribed depending on the size and type of truck utilized as well as the size and type of trailer. For example, for non-commercial trucks, federal regulations provide a maximum of 36,000 pounds of gross combined weight rating which includes the weight of the vehicle and the weight of a trailered load.

The distribution of trailer weight has a profound effect on the cargo capacity allowable in a truck and trailer combination. Put another way, if one can maximize the weight of the load that is placed on or carried by the axles of the truck, then the amount of weight in the trailer may likewise be maximized. Thus, for lighter trucks, a larger cargo load may be possible if the weight is distributed properly. For example, a 12,000 pound truck may pull a load that is 3,000 pounds heavier than a 15,000 pound truck if the weight is properly distributed onto the axles of the truck.

Current solutions involve determining the weight of the truck that will pull a specific trailer and then subsequently affixing a king pin to the trailer at a specified location to maximize the weight distribution of the trailer load and thereby maximize the weight within the trailer for use with that specific truck (or identically sized and configured trucks). Once that king pin in placed in the proper position, it is welded or otherwise permanently affixed on that trailer and that trailer subsequently is typically used only with that truck or other identically sized and configured trucks. For example, when using a trailer configured for a lighter weight truck, the king pin may be placed further back, thus placing more of the trailer load on the axle of the truck. Then, if that same trailer is used with a heavier truck, less weight is permitted on the axles of the truck. Therefore the load of the trailer must be reduced and the weight must be distributed further back towards the axles of the trailer thus reducing the overall towing capability of the larger truck and reducing the usable cargo weight in that trailer. Conversely, when a trailer is configured for a heavier truck, the king pin may be placed further forward to place more weight on the axles of the trailer and less weight on the axles of the truck. If this trailer is then utilized with a lighter-weight truck, the position of the king pin causes the weight distribution to be further back, and the weight savings of the lighter truck cannot translate into additional cargo weight. Accordingly, with current configurations, once the location of the king pin is determined relative to the truck pulling the trailer, the maximum load, load distribution, and efficiency of the truck and trailer combination is only realized when utilizing an identical truck.

SUMMARY

The present disclosure addresses these and other issues by providing an adjustable trailer hitch and king pin assembly that may be moved longitudinally to adjust the position and weight distribution of a trailer relative to a truck. The disclosed assembly may allow a trailer to be utilized with various different sized and configured trucks while maximizing the cargo carrying capability and efficiency thereof. In one example, an adjustable trailer hitch is provided having a slidable king pin assembly that may be adjusted forwards or backwards to move the king pin to the desired location relative to the truck and trailer. In another example, a removable king pin may be provided that may be removed and moved to a different location according to the weight and desired weight distribution of a truck and trailer combination.

In one aspect, an exemplary embodiment of the present disclosure may provide a trailer hitch assembly comprising: a hitch frame; a king pin assembly slidably engaged with the hitch frame; at least one lock pin assembly carried by the king pin assembly having at least one lock pin operable to engage at least one aperture defined in the hitch frame to secure the king pin assembly in position within the hitch frame; and a king pin carried by the king pin assembly that is longitudinally moveable relative to the hitch frame via the slidable engagement of the king pin assembly and the hitch frame; at least one air bag assembly operably engaged with the at least one lock pin to disengage the at least one lock pin from the at least one aperture in the hitch frame.

In another aspect, and exemplary embodiment of the present disclosure may provide a method of adjusting the position of a king pin location on a trailer comprising: inflating an air bag to retract a lock pin carried by a king pin assembly to disengage the lock pin from a first aperture defined in an associated hitch frame; moving the king pin assembly from a first position within the hitch frame defined by the first aperture to a second position within the hitch frame defined by a second aperture defined in the hitch frame; and deflating the air bag to extend the lock pin to engage the lock pin with the second aperture.

In yet another aspect, and exemplary embodiment of the present disclosure may provide a method of redistributing the weight of a trailer and cargo comprising: inflating an air bag to disengage a king pin assembly from a forward position wherein a king pin carried by the king pin assembly is secured to a hitch frame of a trailer near a front end thereof; moving the king pin assembly longitudinally from the forward position to a rearward position wherein the king pin is secured to the hitch frame of the trailer towards the rear end thereof; and securing the king pin assembly in the rearward position; wherein a greater portion of the weight of the trailer and a cargo carried by the trailer is distributed rearward onto at least one axle of the trailer when the king pin assembly is in the forward position and wherein a greater portion of the weight of the trailer and the cargo carried by the trailer is distributed forward onto at least one axle of a truck when the king pin assembly is in the rearward position.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a left side elevation view of the first embodiment of a hitch frame assembly looking in the direction of the line indicated in FIG. 3 according to one aspect of the present disclosure.

FIG. 5 is a side cross section view of the first embodiment of a hitch frame assembly looking in the direction of the line indicated in FIG. 3 according to one aspect of the present disclosure.

FIG. 6 is a rear elevation view of the first embodiment of a hitch frame assembly looking in the direction of the line indicated in FIG. 3 according to one aspect of the present disclosure.

FIG. 7 is a rear elevation view of the first embodiment of a king pin assembly according to one aspect of the present disclosure.

FIG. 15 is a bottom plan view of the second embodiment of a hitch frame assembly according to one aspect of the present disclosure.

FIG. 16 is a left side elevation view of the second embodiment of a hitch frame assembly looking in the direction of the line indicated in FIG. 14 according to one aspect of the present disclosure.

FIG. 17 is a partial side cross section view of the second embodiment of a hitch frame assembly looking in the direction of the line indicated in FIG. 14 according to one aspect of the present disclosure.

FIG. 23 is a rear elevation cross section view of the third embodiment of a hitch frame assembly looking in the direction of the line indicated in FIG. 21 according to one aspect of the present disclosure.

FIG. 24 is a partial rear cross section view of one side of the third embodiment of a hitch frame assembly looking in the direction of the line indicated in FIG. 21 according to one aspect of the present disclosure.

FIG. 25 is a rear elevation operational view of the third embodiment of a hitch frame assembly according to one aspect of the present disclosure.

FIG. 26 is a partial rear cross section operational view of the side of the third embodiment of a hitch frame assembly from FIG. 24 according to one aspect of the present disclosure.

Similar numbers refer to similar parts throughout the drawings.

DETAILED DESCRIPTION

Figure 1:
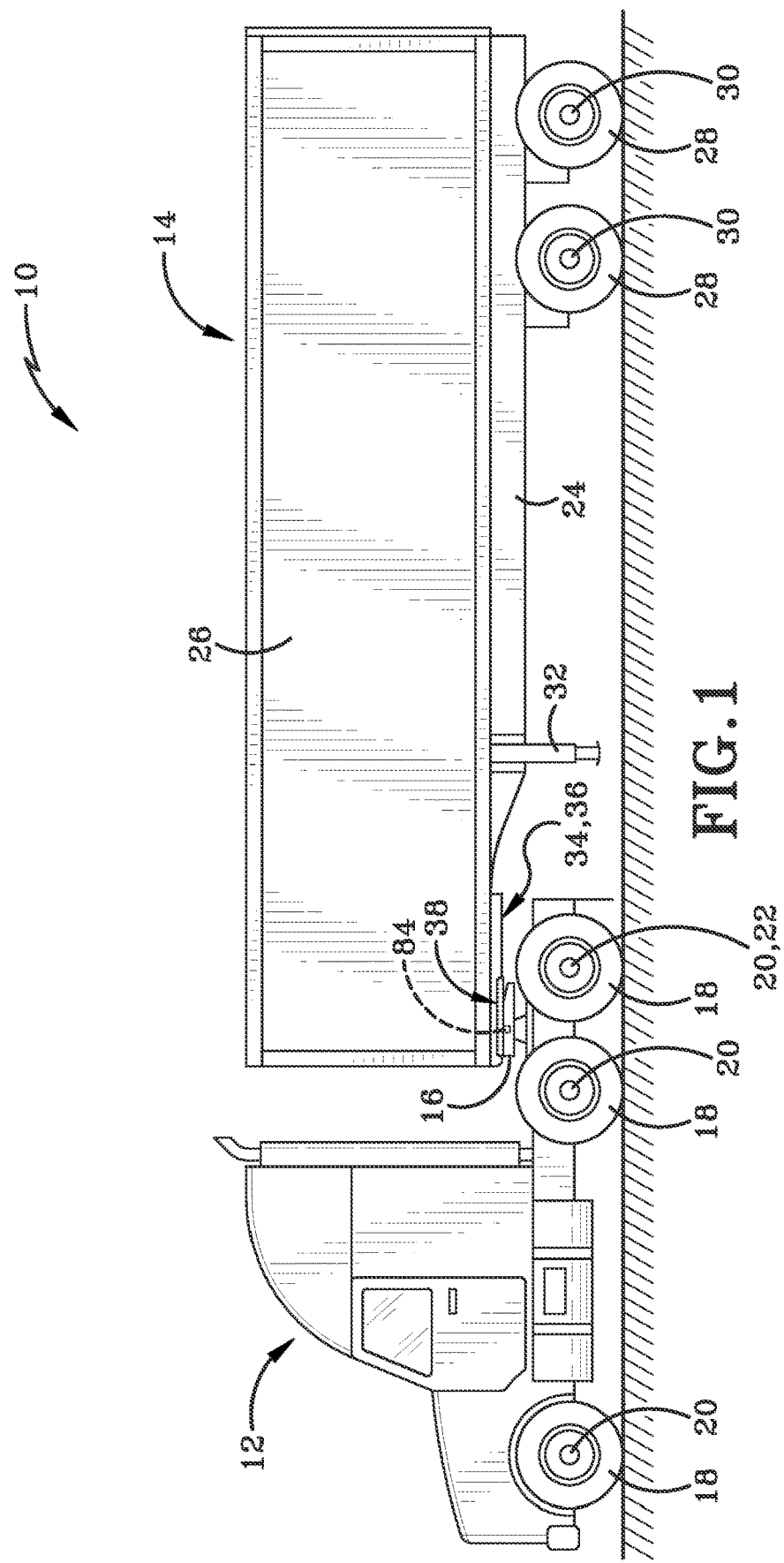
FIG. 1 is a side elevation view of a truck and trailer according to one aspect of the present disclosure.

With reference to FIG. 1, a tractor trailer is shown and generally indicated at reference 10. Tractor trailer 10 may include a truck 12 and a trailer 14 that is operably towed and/or connected to truck 12 via a fifth wheel hitch 16. Tractor trailer 10 may be generally understood to be a truck 12 and trailer 14 of any particular size and configuration provided the operable connection between truck 12 and trailer 14 utilizes fifth wheel hitch 16, as discussed further below.

Truck 12 is shown as a semi-truck but it will be understood that truck 12 may be any suitable truck, including semis, commercial trucks, non-commercial trucks, and/or any other suitable truck capable of towing a trailer 14 via a fifth wheel hitch 16. Truck 12 may include at least two pairs of ground-engaging wheels 18 situated on two or more axles indicated at reference 20. Fifth wheel hitch 16 may be disposed on truck 12 forward of the rearward-most axle 22 of the two or more axles 20.

Trailer 14 may be any suitable sized and configured trailer including but not limited to semi-trailers, cargo trailers, flatbed trailers, or the like. Trailer 14 may have a frame 24 supporting a body 26 and may further include at least one pair of ground-engaging wheels 28 arranged on at least one longitudinal axle 30. Trailer 14 may further include a support mechanism 32 operable to support the front end of trailer 14 when not engaged with truck 12. Trailer 14 may further include a fifth wheel hitch assembly 34 which may be hereinafter referred to as hitch frame assembly 34. Hitch frame assembly 34 may include a hitch frame 36 and a king pin assembly 38 as discussed further herein. According to one aspect, frame 24 of trailer 14 may fully support or otherwise be configured to fully support trailer body 26 and trailer 14, generally, and may include any suitable or necessary components thereon for normal operation. As will be apparent, the remainder of the disclosure herein will be discussed with particular reference to hitch frame assemblies 34, 234, and 434, including hitch frames 36, 236, and 436, and king pin assemblies 38, 238, and 438. It will be further understood that hitch frame assemblies 34, 234, and 434 may be readily adapted for use with any suitable size and type of trailer 14 as dictated by the desired implementation and as discussed further below.

Figure 2:
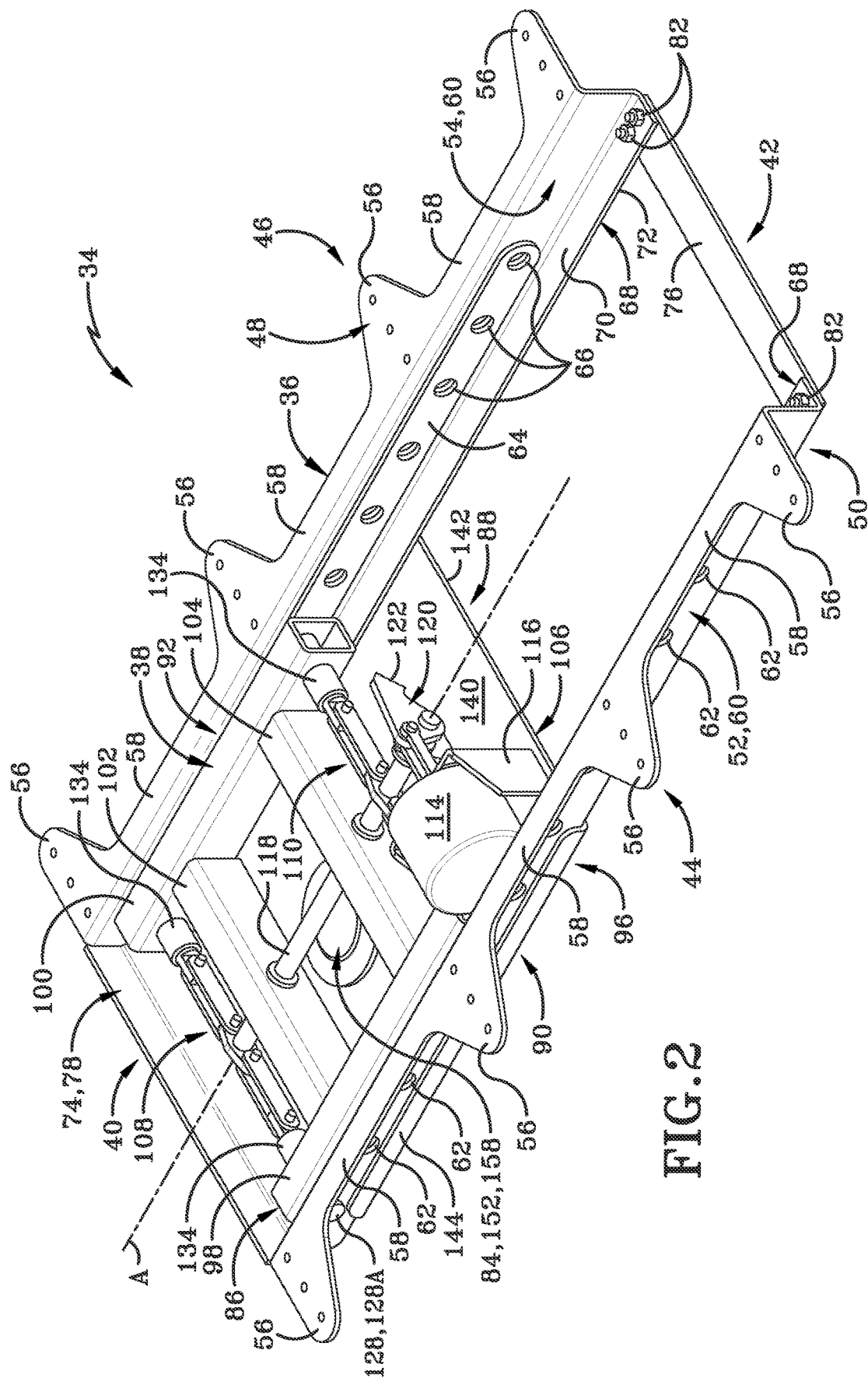
FIG. 2 is a top isometric view of a first embodiment of a hitch frame assembly according to one aspect of the present disclosure.

With reference generally to FIGS. 2-12, a first embodiment of a hitch frame assembly 34 of the present disclosure is shown and will now be described. With particular reference to FIGS. 2-2B, hitch frame assembly 34 may include hitch frame 36 and king pin assembly 38.

Figure 2A:
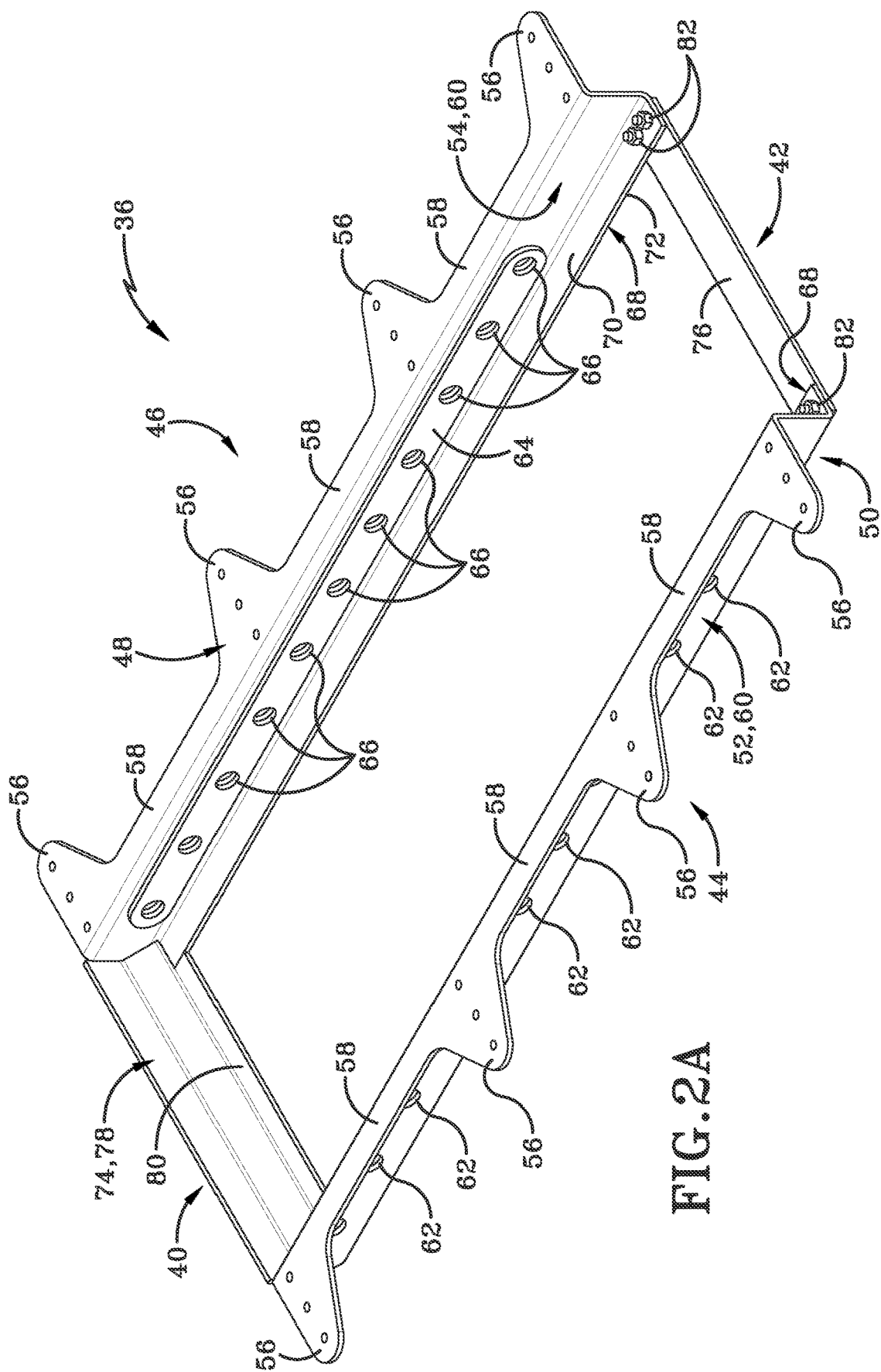
FIG. 2A is a top isometric view of the first embodiment of a hitch frame according to one aspect of the present disclosure.
Figure 2B:
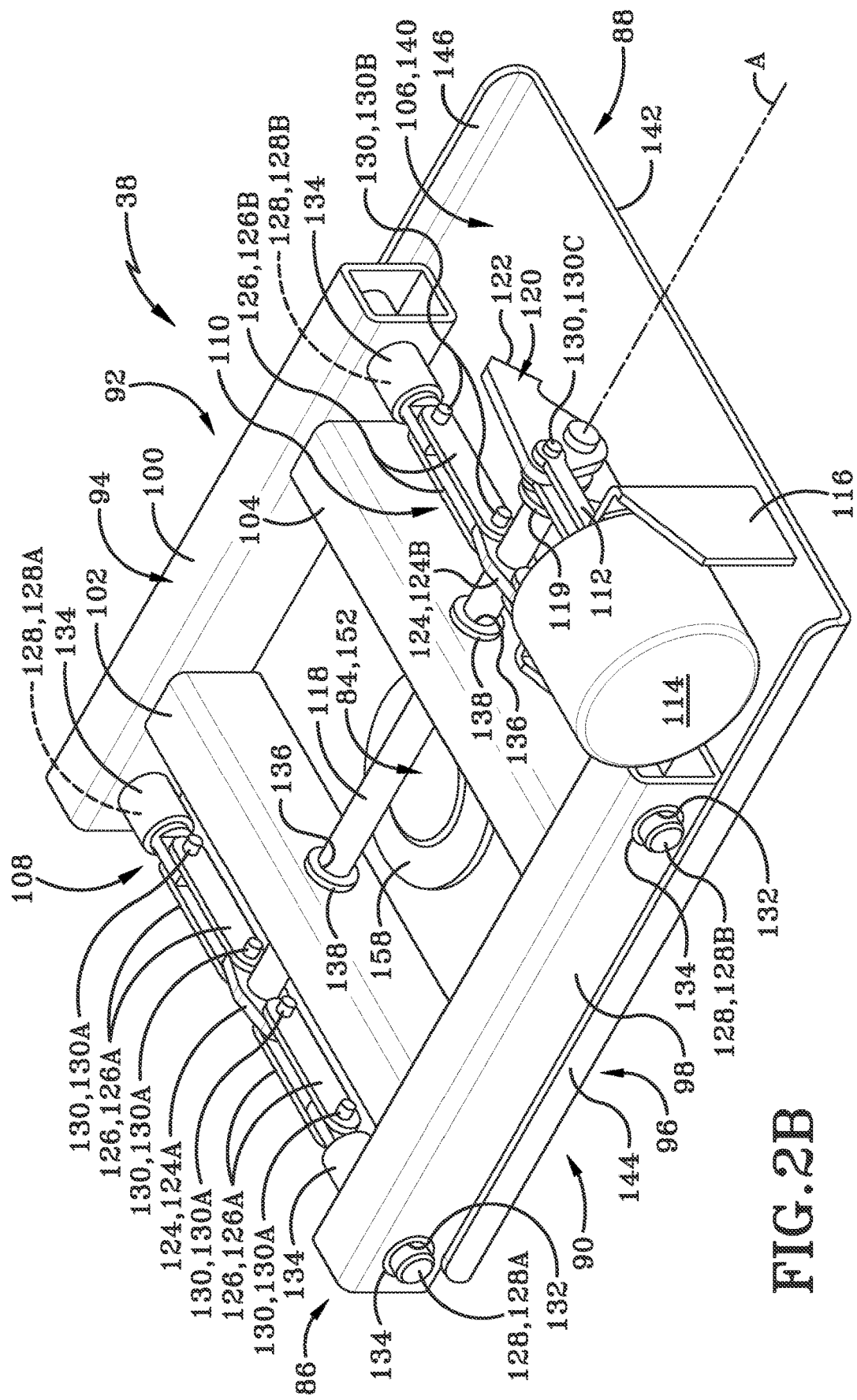
FIG. 2B is a top isometric view of the first embodiment of a king pin assembly according to one aspect of the present disclosure.
Figure 3:
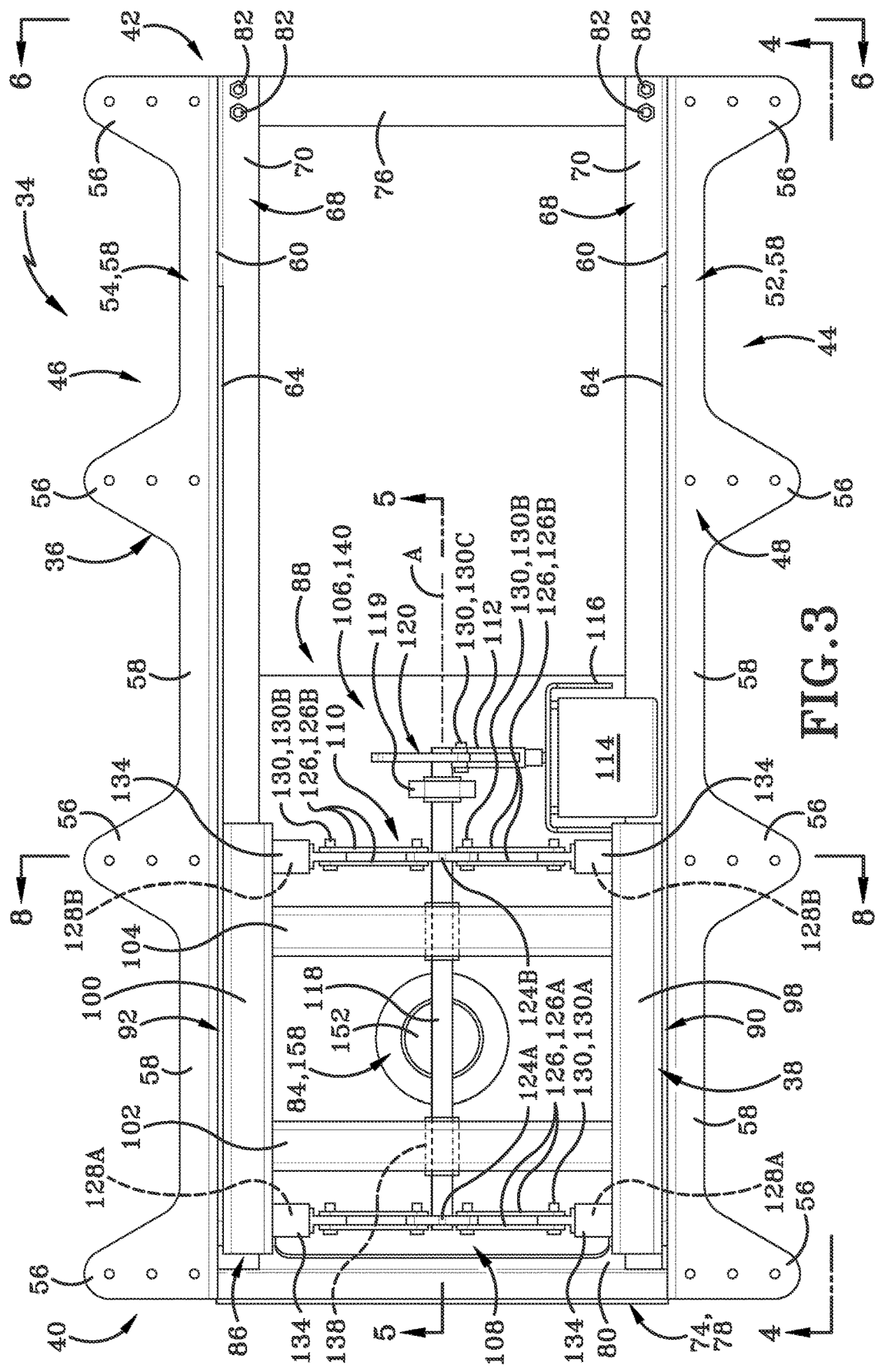
FIG. 3 is a top plan view of the first embodiment of a hitch frame assembly according to one aspect of the present disclosure.
Figure 8:
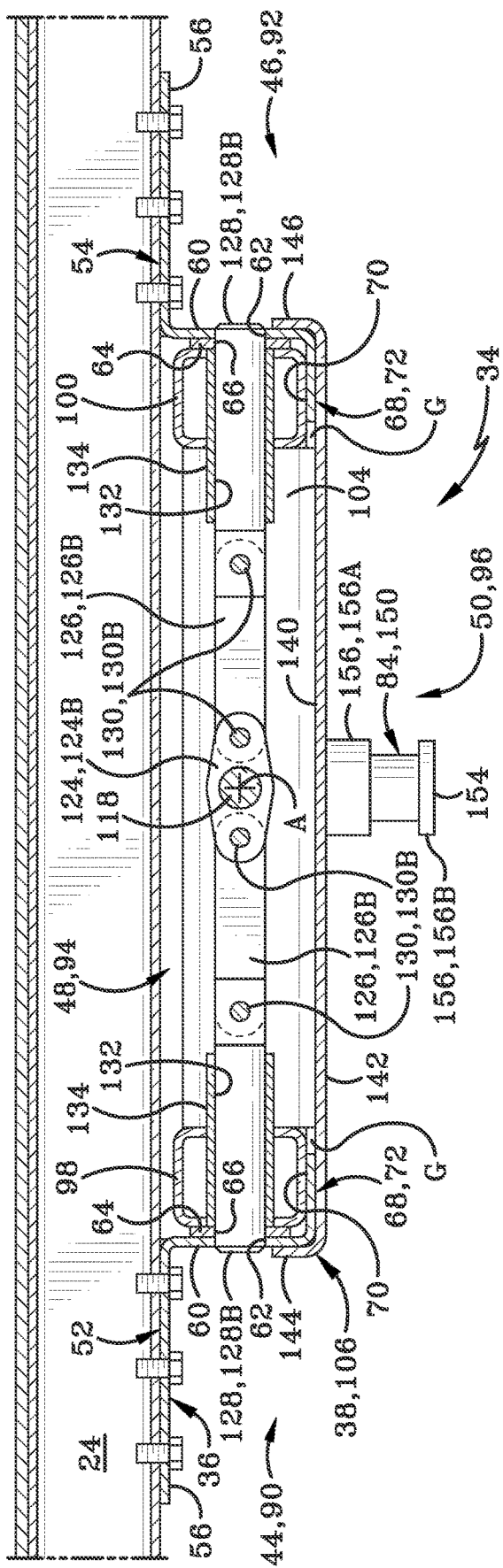
FIG. 8 is a rear cross section view of the first embodiment of a hitch frame assembly looking in the direction of the line indicated in FIG. 3 according to one aspect of the present disclosure.

With reference to FIGS. 2 and 2A, hitch frame 36 may have a front end 40 spaced apart from a back end 42 and defining a longitudinal direction therebetween. This longitudinal direction may be generally defined as the direction of travel for trailer 14 and may be substantially parallel to Axis A (as indicated best in FIG. 2—discussed further herein). Hitch frame 36 may further include a left side 44 spaced apart from a right side 46 and defining a transverse direction therebetween which may be substantially perpendicular to Axis A and the direction of travel of trailer 14. Hitch frame 36 may have a top side 48 spaced apart from a bottom side 50 defining a vertical direction therebetween.

Hitch frame 36 may be generally rectangular and may have a first side member 52 which may define the left side 44 and a second side member 54 which may define the right side 46 of frame 36. Each of first and second side members 52 and 54 may be substantially similar or identical but for their placement and orientation within hitch frame 36. According to one aspect, first side member 52 may be a mirror image of second side member 54.

Each of first and second side members 52 and 54 may have a plurality of mounting flanges 56 disposed on the top 48 thereof which may be further separated by lip 58. These mounting flanges 56 and lips 58 may define the top side 48 of hitch frame 36 and may further facilitate attachment of hitch frame 36 to frame 24 of trailer 14. Hitch frame 36 may be attached to frame 24 through any suitable means including, but not limited to, bolts, screws, rivets, welds, or the like. Alternatively, according to one aspect, hitch frame 36 may be formed as part of trailer frame 24 as dictated by the desired implementation.

Each of first and second side members 52 and 54 may further have a vertical sidewall 60 which may extend between top side 48 and bottom side 50. These sidewalls 60 may further include one or more apertures 62 defined therethrough for operable connection to king pin assembly 38, as discussed further below. First and second side members 52 and 54 may further include one or more rails 64 which may extend longitudinally along the inner side of first and second side members 52 and 54 such that rails 64 may be opposite each other and oriented to face the opposite rail 64. The inner side, as used herein, may be defined as the side of first and second side members 52, 54 facing an imaginary longitudinal centerline bisecting hitch frame assembly 34 that may coincide with Axis A. Each rail 64 may further include a plurality of rail apertures 66 which may aligned with and substantially continuous with sidewall apertures 62 for operable connection to king pin assembly 38, as discussed further below.

Extending inward (i.e. towards the imaginary centerline of hitch frame assembly 34) from sidewalls 60 of first and second side members 52 and 54 may be a bottom shelf 68 which may be generally planar and may extend the full length from front end 40 to back end 42 and may interact with king pin assembly 38 to provide support therefor, as discussed further herein. Bottom shelf 68 may have a top surface 70 spaced vertically apart from a bottom surface 72 and each of these surfaces, namely top surface 70 and bottom surface 72, may provide support, an engaging surface, and/or an attachment point for king pin assembly 38, as discussed further below.

Hitch frame 36 may include a forward or front cross member 74 and a rear cross member 76 disposed generally at the front and back ends 40 and 42 of frame 36, respectively. Front cross member 74 may have a generally arcuate profile and may include a vertical portion 78 and a base portion 80. Base portion 80 may be generally planar with bottom shelf 68 of side members 52 and 54. This shape and configuration of front cross member 74 may serve to deflect wind and/or road debris from entering into hitch frame assembly 36 and/or king pin assembly 38. Forward cross member 74 may be removably connected to first and second side members 52 and 54, or may be more permanently affixed via welds, rivets, or the like.

Rear cross member 76 may be generally planar and may be removable from frame 36 to allow for installation and removal of king pin assembly 38, as discussed further below. Accordingly, rear cross member 76 may be removably fastened to first and second side members 52 and 54 via one or more bolts 82 or other similar removable fastening means as dictated by the desired implementation.

Each component of hitch frame 36 may be formed or manufactured using any suitable material and by any suitable manufacturing methods, as dictated by the desired implementation; however, it will be understood that hitch frame 36 and the various components thereof are contemplated to be exposed to variable road and weather conditions as well as may be configured to support large trailers such as trailer 14 and may therefore be contemplated to be constructed to be robust. According to one example, components of frame 36 may be constructed of steel, including hardened steel, stainless steel, or the like, aluminum, or any other suitable metal. According to one aspect, rails 64 may be similarly constructed in that rails 64 may be formed of steel or any other suitable metal. According to another aspect, rails 64 may be constructed of a low wear and low friction material such as high density polyethylene or any other suitable polymer or any other similar material as dictated by the desired implementation. Further, according to this aspect, rails 64 may be provided to both support, reinforce, and reduce friction between hitch frame 36 and king pin assembly 38 when both are engaged, as discussed further herein.

With reference to FIGS. 2 and 2B, king pin assembly 38 is shown and will now be discussed in further detail. King pin assembly 38 is understood as the assembly carrying king pin 84 and may have a front end 86 spaced apart from a back end 88 defining therebetween a longitudinal direction. Front end 86 and back end 88 of king pin assembly 38 may generally correspond to front end 40 and back end 42 of hitch frame 36. Further, this longitudinal direction defined between front and back end 86 and 88 of king pin assembly 38 may likewise be generally understood as the direction of travel for trailer 14 and may be generally parallel to Axis A as seen in FIG. 2B and discussed further below. King pin assembly 38 may have a left side 90 corresponding to left side 44 of hitch frame 36 and may be spaced apart from a right side 92 corresponding to right side 46 of hitch frame assembly 36. The left side 90 and right side 92 of king pin assembly 38 may likewise define a transverse direction therebetween. King pin assembly 38 may have a top side 94 spaced apart from a bottom side 96 defining the vertical direction therebetween and generally corresponding to top side 48 and bottom side 50 of hitch frame 36.

King pin assembly 38 may include a first side member 98 and a second side member 100 which may be longitudinal side members corresponding to left and right sides 90 and 92, respectively. King pin assembly 38 may further include a first cross member 102 and a second cross member 104 extending transversely with first cross member 102 generally positioned towards front end 86 of king pin assembly 38 and second cross member 104 generally positioned towards the back end 88. King pin assembly 38 may further include a base plate 106 which may extend beneath first and second side members 98, 100 and first and second cross members 102, 104 and may further support other components of king pin assembly 38 as discussed further below.

King pin assembly 38 may have a pair of lock pin assemblies, namely, front lock pin assembly 108 and rear lock pin assembly 110. These lock pin assemblies 108 and 110 may be operable to lock king pin assembly 38 in position within hitch frame 36, as discussed further with reference to the operation thereof below. Lock pin assemblies 108 and 110 may be operably connected and may include an actuator or piston 112 and a hydraulic cylinder 114 which may be supported to king pin assembly 38 via a mounting plate 116. Lock pin assemblies 108 and 110 may further include a longitudinal rod 118 which may extend longitudinally between front end 86 and back end 88 of king pin assembly 38 and may define longitudinal rotation Axis A which may be best seen in FIG. 2B. Rod 118 may have a rod mount 119 to support one end thereof. Rod 118 may further include a stop member 120 which may have a flat end face 122 which may interact with a top surface 140 of base plate 106 as discussed further below.

Each of front pin assembly 108 and rear pin assembly 110 may be substantially similar or identical but for their placement within king pin assembly 38 such that front lock pin assembly 108 may be the assembly most near the front end 86 of king pin assembly 38 while rear lock pin assembly 110 may be the assembly most near the back end 88 thereof. Each of front and rear lock pin assemblies 108 and 110 may include a central cam 124 which may be operably connected to rod 118 to facilitate the movement of lock pin assemblies 108 and 110 as discussed further below. As indicated in FIG. 2B and generally shown throughout FIGS. 2-12, the components of lock pin assemblies 108 and 110 may be substantially identical; however, they may be identified with the designation 'A' for front lock pin assembly 108 and 'B' for rear lock pin assembly 110. For example, central cam 124A may be the central cam of front lock pin assembly 108 while central cam 124B may be the central cam of rear lock pin assembly 110. Therefore, it will be understood that references to the components of lock pin assemblies 108 and 110, having a reference number without this 'A' or 'B' designation, are understood to refer generally to either lock pin assembly 108 and 110 while references including the 'A' or 'B' designation may refer specifically to those specific components. Further, similar components designated 'C' (for example, pivot pin 130C) may be substantially identical to their like numbered counterparts with the designation 'C' indicating their placement in king pin assembly 38. In particular, those components with a 'C' designation may be longitudinally further towards back end 88 of king pin assembly 38 and generally associated with stop member 120.

Lock pin assemblies 108 and 110 may further include one or more pin linkage arms 126 which may connect central cams 124 to lock pins 128, respectively. Pin linkage arms 126 may be pivotally connected to central cam 124 and to lock pins 128 via one or more pivot pins 130. Similarly, as best seen in FIG. 2B, stop member 120 may be operably and pivotally connected to piston 112 via one or more pivot pins 130 (i.e. 130C). As discussed further below with reference to the operation thereof, pivot pins 130 may allow pivotal movement to drive lock pins 128 in and out of lock pin apertures 132 formed through first and second side members 98 and 100. According to one aspect, lock pin apertures 132 may include a bushing 134 or the like to support and/or facilitate movement of lock pins 128 therein.

As discussed previously herein, rod 118 may extend longitudinally from front end 86 to back end 88 of king pin assembly 38 and may be connected to central cam 124A on the forward end 86 thereof and may be connected to stop member 120 on the back end 88 thereof. Rod 118 may pass through rod apertures 136 formed through first and second cross members 102 and 104 and may likewise be supported by rod bushings 138 which may further facilitate rotational movement of rod 118 therein. Rod 118 may be fixedly connected to central cams 124A and 124B and to stop member 120 such that rotation of rod 118 may likewise cause rotation of central cams 124 and stop member 120 as discussed further herein. Rod mount 119 may be disposed towards the back end 88 of rod 118 to support rod 118 nearest stop member 120 while the middle and front of rod 118 may be supported by cross rod apertures 136 and bushings 138 where rod 118 passes through cross members 102 and 104.

As best seen in FIGS. 2B, 6, and 7, base plate 106 may extend longitudinally from front end 86 to back end 88 and transversely from the exterior of first side member 98 beyond the exterior of second side member 100. Base plate 106 may be generally U-shaped (when viewed from front or back end 86 or 88) and may have a top face 140 and a bottom face 142 opposite vertically thereto. Base plate 106 may further have a first side flange 144 which may bend generally upwards and extend vertically exterior (i.e. away from Axis A and the imaginary centerline of hitch frame assembly 34) of first side member 98 and a second side flange 146 which may extend vertically and exterior of second side member 100. The side flanges 144 and 146 may be spaced slightly apart (as part of gap G shown in FIG. 7) from side members 98 and 100 to allow slidable passage of sidewalls 60 of first and second side members 52 and 54 of hitch frame 36 therebetween, as discussed below.

Base plate 106 may be attached to forward and rear cross members 102 and 104 while side members 98 and 100 may be spaced slightly above base plate 106. The space between base plate 106, side flanges 144 and 146, and side members 98 and 100 is best seen as gap G indicated in FIG. 7. As mentioned previously, gap G may permit slidable passage of first and second side members 52 and 54 of hitch frame 36 therethrough. More particularly, gap G may permit sidewalls 60 and bottom shelf 68 to pass between side members 98 and 100 and base plate 106 of king pin assembly 38.

According to one aspect, base plate 106 may serve as a mounting plate for various components of king pin assembly 38 while further functioning to deflect debris that may come from the road on which the truck 12 and trailer 14 are being operated.

With continued reference to FIGS. 2-12 but as best seen in FIG. 5, king pin assembly 38 may further include king pin 84 which may extend downwardly therefrom. More particularly, king pin 84 may extend through a king pin aperture 148 defined in base plate 106 and may further have a body 150 having a top 152 spaced vertically apart from a bottom 154. The body 150 of king pin 84 may further include a pair of collars 156 with an upper collar 156A spaced vertically apart from a lower collar 156B to form the proper configuration for operable attachment to a standard fifth wheel hitch, such as fifth wheel hitch 16. King pin 84 may be removably or permanently affixed to base plate 106 via a flange 158 which may extend above base plate 106 to provide an attachment surface thereto. According to one aspect, king pin 84 may be bolted, welded, riveted, or attached through any other suitable attachment means.

The components and elements of king pin assembly 38, similarly to hitch frame 36, may be formed of any suitable material again with the understanding of the expected use and implementation thereof. According to one aspect, king pin assembly 38 and the components thereof may be constructed of steel or other suitable metal. According to another aspect, king pin assembly 38 may include anti-friction coatings or materials to promote and facilitate the slidable engagement between king pin assembly 38 and hitch frame 36 as discussed further herein.

Having thus described the elements and components of a first embodiment of hitch frame assembly 34, including hitch frame 36 and king pin assembly 38, the slidable engagement and operation thereof will now be discussed.

Figure 9:
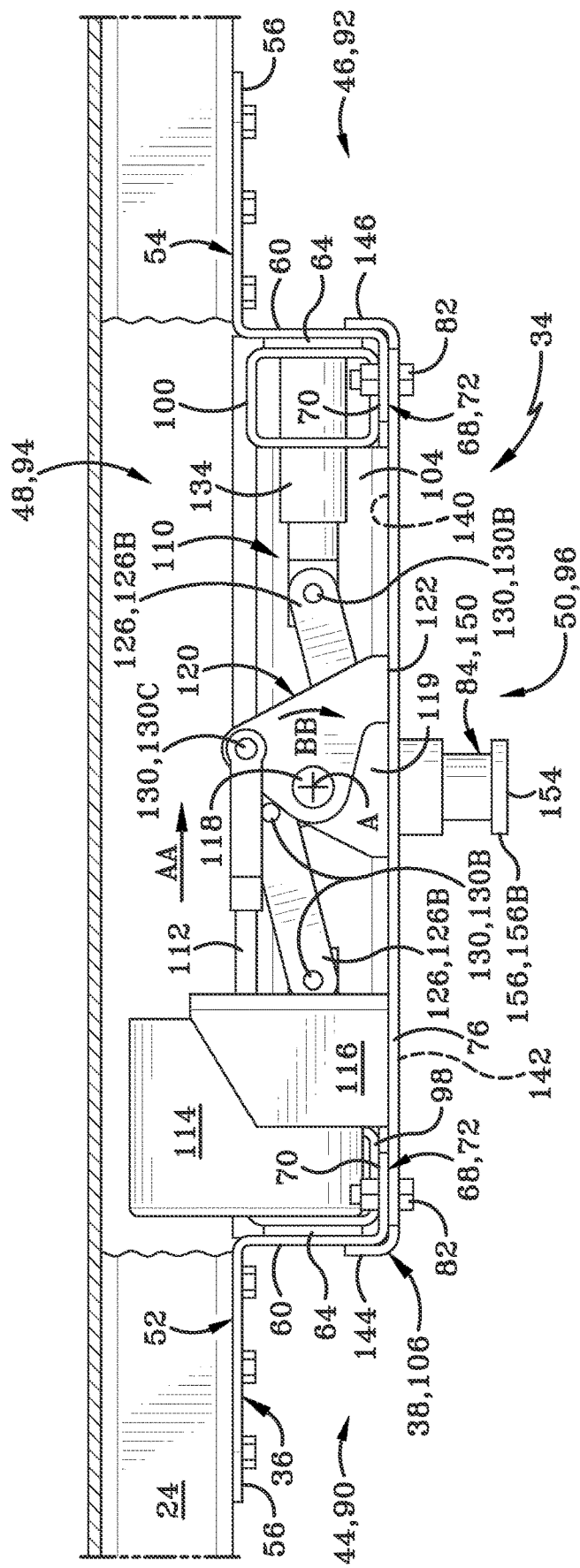
FIG. 9 is a rear elevation operational view of the first embodiment of a hitch frame assembly according to one aspect of the present disclosure.
Figure 10:
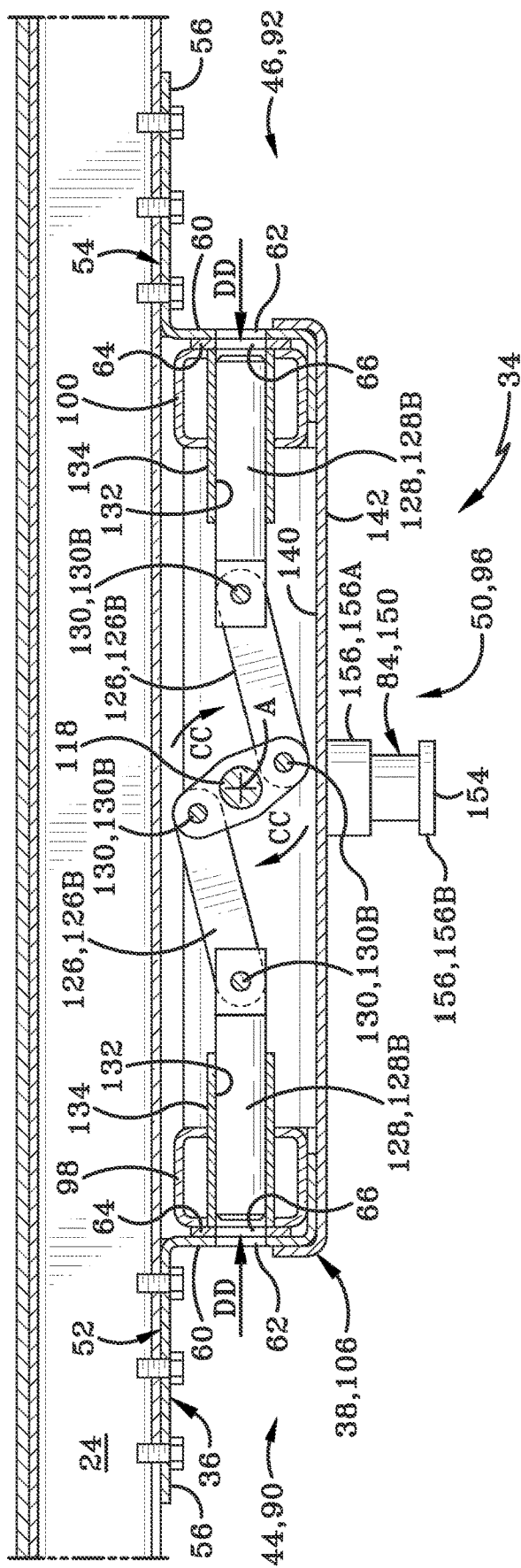
FIG. 10 is a rear elevation operational view of the first embodiment of a hitch frame assembly according to one aspect of the present disclosure.

With reference to FIGS. 3-12, the operation and assembly of hitch frame assembly 34 will be discussed in more detail. As best seen in FIG. 6 and FIG. 7, king pin assembly 38 may slidably engage with hitch frame 36 in that king pin assembly may be inserted between first and second side members 52 and 54 of hitch frame 36 such that bottom shelf 68 and side walls 60 may be slidably engaged through gap G of king pin assembly 38. The top surface 70 of bottom shelf 68 may then be adjacent or against the bottom of first and second side members 98 and 100 of king pin assembly 38, while the bottom surface 72 of shelf 68 may be adjacent or against the top face 140 of base plate 106. In this position, with lock pins 128 in a disengaged or retracted position (as best seen in FIGS. 9 and 10), king pin assembly 38 may be slid longitudinally within hitch frame 36 to any desired position to be locked in place as discussed below. Once king pin assembly 38 is inserted into hitch frame 36, typically accomplished from the back end 42 of hitch frame 36, the rear cross member 76 may then be installed and attached to hitch frame 36 via bolts 82 to secure king pin assembly 38 within hitch frame 36. As mentioned above, the ability to remove rear cross member 76 from hitch frame 36 may allow king pin assembly 38 to be installed or removed therefrom for any suitable purpose, such as maintenance, repair, or the like, without having to remove hitch frame 36 from frame 24 of trailer 14.

As king pin assembly 38 is longitudinally slidable within hitch frame 36, king pin 84 itself may be adjusted to multiple positions within hitch frame 36 to change the mounting point of trailer 14 relative to truck 12. This capability may permit the weight of the trailer 14 and any cargo contained therein to be shifted to provide maximum efficiency and maximum payload capacity depending on the size and capacity of truck 12. For example, where truck 12 is lighter, king pin 84 may be shifted towards back end 42 of hitch frame 36; thus, providing more of the trailer 14 and associated cargos weight on the axles 20 of truck and/or forward of rearward-most axle 22 of truck 12; thus, maximizing the allowable weight on the axles 30 of trailer 14, and thereby maximizing the total cargo capacity of tractor trailer 10. Where truck 12 is heavier, king pin 84 may be shifted towards front end 40 of hitch frame 36 to reduce the amount of weight on truck axles 20 and rearward-most truck axle 22 to, again, optimize and maximize the trailer capacity. This adjustable king pin feature may permit hitch frame assembly 34 to be installed on a trailer 14 and then subsequently that trailer 14 may be utilized with any size truck 12. This is in contrast to current setups where king pin 84 would be fixed in place relative to trailer 14; thus, relegating that specific trailer for use with a specific truck 12 and/or reducing or otherwise affecting the amount of cargo that particular trailer is capable of carrying based upon the truck's size.

Further, a trailer 14 with hitch frame assembly 34 installed may be utilized with multiple different sized trucks without the need to add, remove, or otherwise adjust the cargo or weight of the trailer 14. For example, in the event of a road side breakdown, a new truck 12 could be brought in and connected to trailer 14 regardless of the differences in truck 12 size and/or configuration. In such an instance, the cargo within trailer 14 can continue to its destination with the closest or first available truck 12, without having to delay while waiting for an identically sized and configured truck 12 to arrive or without having to adjust the cargo in the trailer to accommodate another truck 12. Instead, the king pin 84 positon may be adjusted, and the new truck 12 may connect to the trailer 14 and drive on.

With continued reference to FIGS. 3-12, but particular reference to FIGS. 9-12, king pin assembly 38 may be slidable or moveable within hitch frame 36 when lock pins 128 are in a retracted position, as seen in FIGS. 9 and 10. To move lock pins from an engaged or extended position (as in FIG. 8) to a disengaged or retracted position as shown in FIGS. 9 and 10, the piston 112 may be activated and extended towards rod 118 in the direction of arrow AA indicated in FIG. 9. This extension may cause stop member 120 to begin rotating in the direction of arrow BB in FIG. 9, which may then cause rotation of rod 118. Stop member 120 is so named for its inclusion of stop face 122, which may encounter top face 140 of base plate 106, thus defining a maximum amount of rotation and thereby preventing over-rotation of rod 118.

Figure 11:
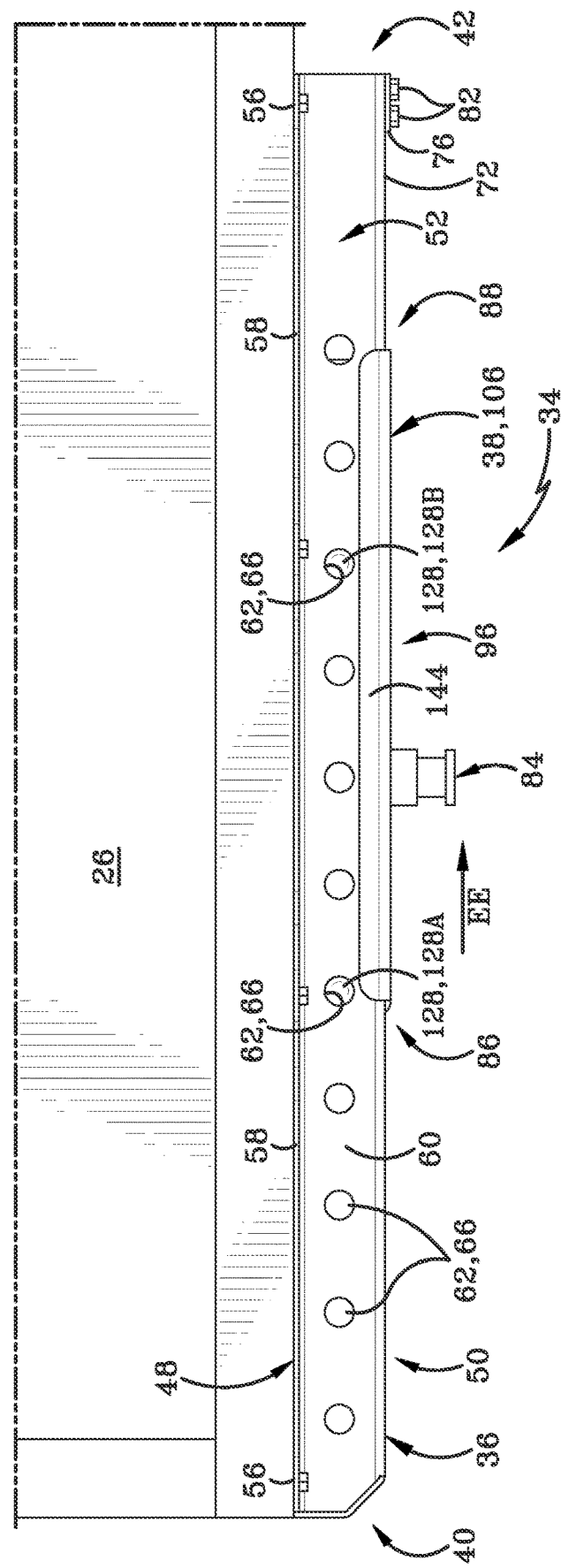
FIG. 11 is a side elevation operational view of the first embodiment of a hitch frame assembly according to one aspect of the present disclosure.

With reference to FIG. 10, the rotation of rod 118 may likewise cause rotation of central cams 124. As shown in FIG. 10, second or rear pin assembly 110 is seen in a partial cross section with piston 112, hydraulic cylinder 114, and mount 116 removed for clarity. As central cam 124 rotates, in direction indicated by arrow CC, the pin linkage arms 126, 126B are pulled towards the center line defined by Axis A running through rod 118. As pin linkage arms 126, 126B are rotatably connected to central cam 124, 124B, they may rotate about pivot pins 130, 130B to allow transverse movement thereof; thus, pulling lock pins 128 towards the centerline in the direction of arrows DD, indicated in FIG. 10. This action may cause lock pins 128 to move into a retracted position wherein king pin assembly 38 may be freely moved longitudinally within hitch frame 36. For example, king pin assembly 38 may be moved in the rearward direction indicated by arrow EE in FIG. 11, to place king pin 84 in a desired position as determined by the specific weight of trailer 14 and any cargo associated therewith relative to the weight and size and truck 12. Once in position, lock pins 128 may be aligned with apertures 62 and 66 in hitch frame 36 before the process may be reversed to secure king pin assembly 38 in position. With reference to FIG. 11, lock pins 128 may be sized and configured to engage with side wall apertures 62 and rail apertures 66 of hitch frame 36 to secure hitch pin 84 and hitch pin assembly 38 in the desired position while trailer 14 is in use.

Figure 12:
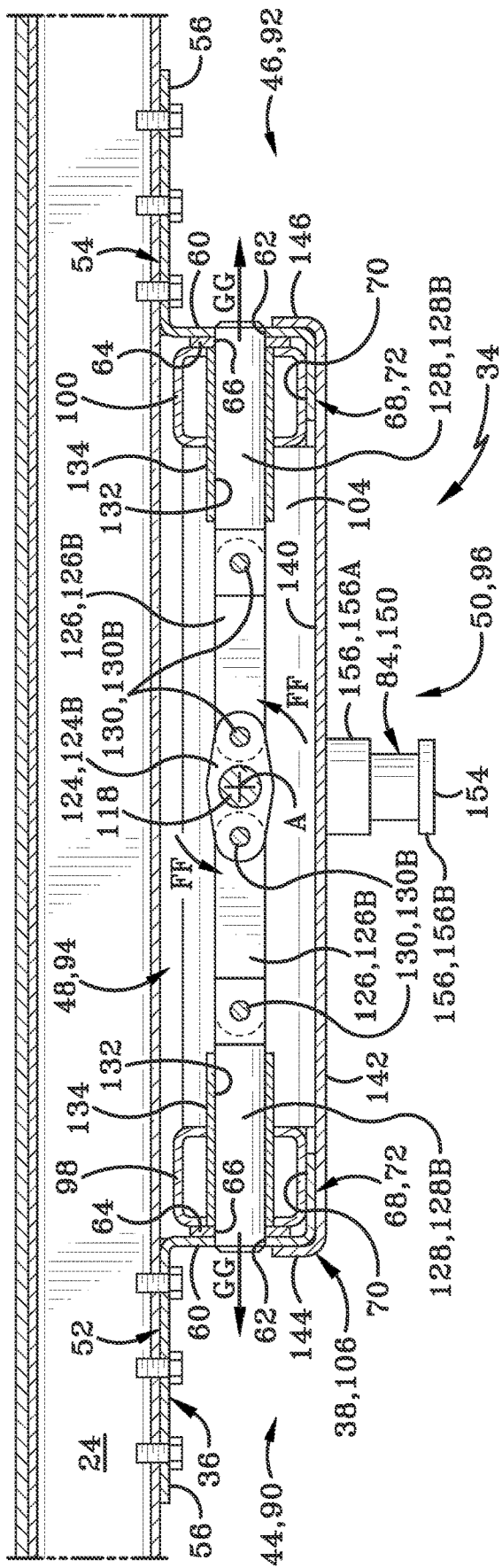
FIG. 12 is the rear cross section view of the first embodiment of a hitch frame assembly from FIG. 8 with operational arrows included therein according to one aspect of the present disclosure.
Figure 13:
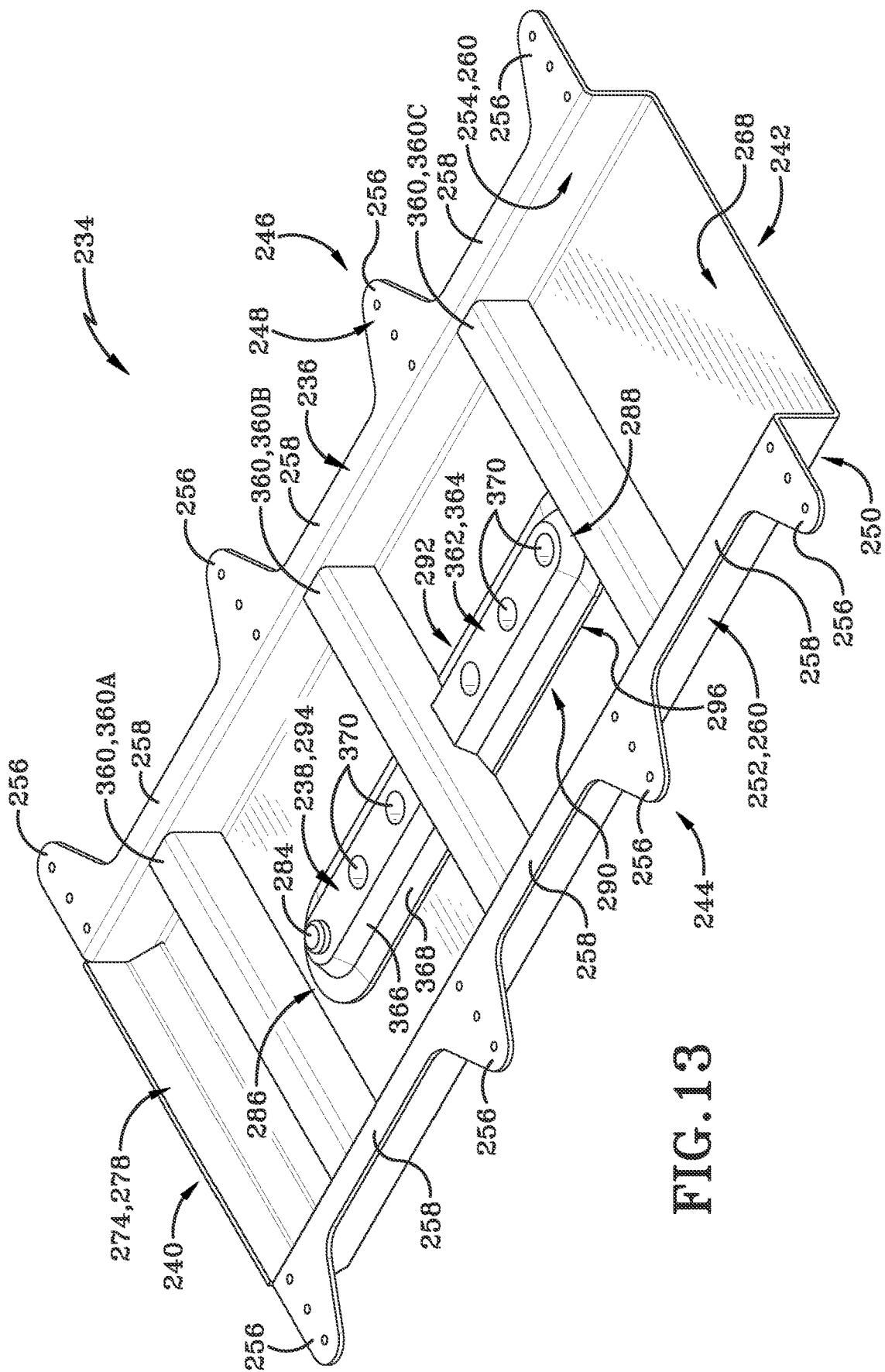
FIG. 13 is a top isometric view of a second embodiment of a hitch frame assembly according to one aspect of the present disclosure.
Figure 14:
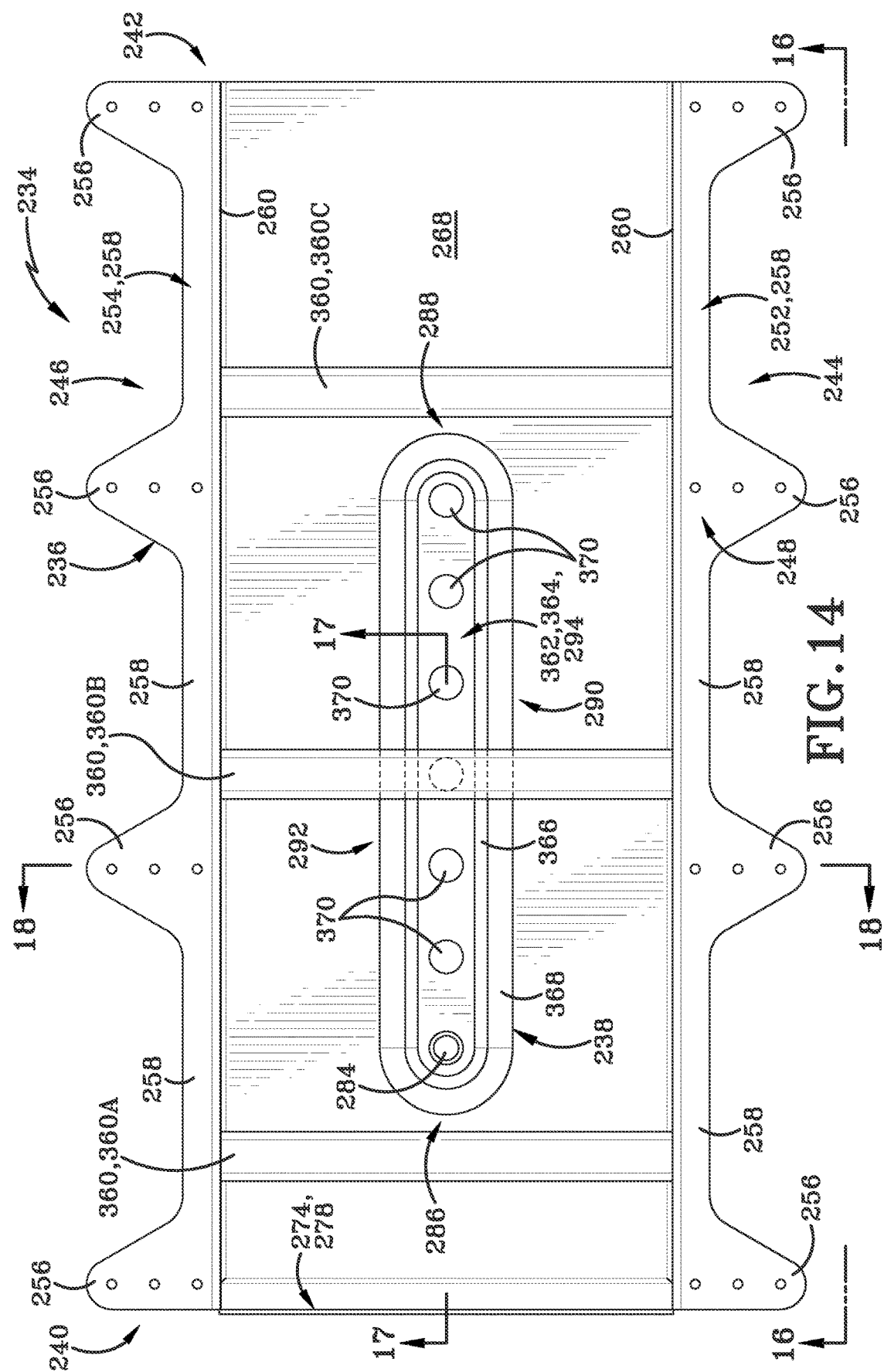
FIG. 14 is a top plan view of the second embodiment of a hitch frame assembly according to one aspect of the present disclosure.
Figure 18:
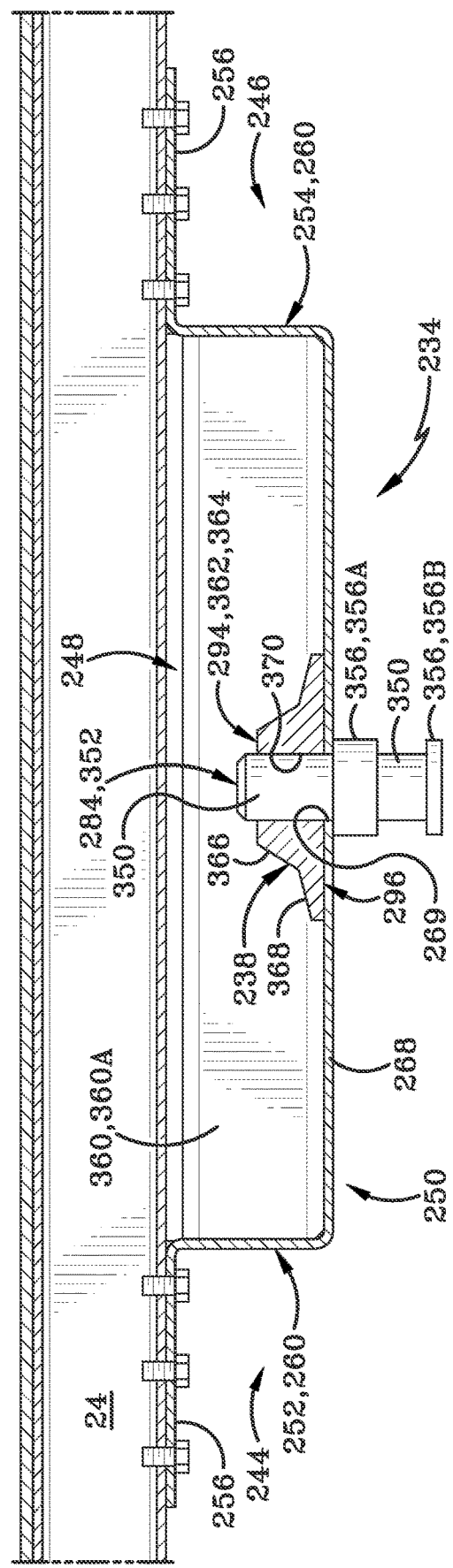
FIG. 18 is a rear cross section view of the second embodiment of a hitch frame assembly looking in the direction of the line indicated in FIG. 14 according to one aspect of the present disclosure.

With reference to FIG. 12, once so aligned the hydraulic cylinder 114 may reverse the action of piston 112, pulling it back and thereby causing rotation of stop member 120, rod 118, and central cams 124, in an opposite direction indicated by arrows FF in FIG. 12. This opposite rotation may in turn move pin linkage arms 126 and lock pins 128 into the locked position as best seen in FIG. 12. In the locked position, lock pins 128 may be fully inserted through and engaged with sidewall 60 and rail 64 via sidewall apertures 62 and rail apertures 66, respectively. This movement may drive lock pins outwardly in a transverse direction as indicated by arrows GG in FIG. 12.

Although the transverse motion of lock pins 128 is described as shown in the figures, it will be understood that king pin assembly 38, lock pin assemblies 108 and 110, and any components thereof may be modified and the mechanism of movement of lock pins 128 between the engaged or extended position and the disengaged or retracted position may be accomplished through other means. According to one aspect, lock pins 128 may be directly connected to one or more actuators and pistons to generate transverse movement. According to another aspect, the rotational movement of rod 118 may be converted to transverse movement through other suitable means. It will therefore be understood that the mechanism of movement of lock pin assemblies 108, 110 and/or lock pins 128 may vary without deviation from the scope of the disclosure herein. Accordingly, it will be further understood that the figures shown and described herein are contemplated to be a representative example and not a limiting example thereof.

Accordingly, in industries where the size of a truck 12 utilized with trailer 14 may vary, this adjustable king pin assembly 38 may provide for a plurality of positions of king pin 84 to allow trailer 14 to be adapted for use with any suitable sized truck while maximizing the efficiency and cargo capacity thereof. According to one example, one contemplated advantage may be to smaller entities utilizing owner operators and/or multiple sized trucks as the hitch frame assembly 34 of the present disclosure may permit such a company to provide adjustable trailers rather than acquiring specified trailers for each truck employed.

Although described herein utilizing a hydraulic system, it will be understood that lock pins assemblies 108 and 110 may be operated using any suitable system or method including electric motors, servo motors, pneumatics, or the like, according to the aspect described herein, lock pin assemblies 108 and 110 may be powered hydraulically as it is common for truck 12 and trailer 14 to include other hydraulic components, thereby providing quick and easy access to a hydraulic system. Accordingly, it will be understood that hitch frame assembly 34 may include any necessary connectors or components including, but not limited to, hoses, electrical connections, or the like for proper operation of king pin assembly 38. It will be further understood that the longitudinal and slidable engagement of king pin assembly 38 within hitch frame 36 may be adjusted manually or through mechanical means and/or automated means as dictated by the desired implementation thereof.

With reference now to FIGS. 13-19, a second embodiment of a hitch frame assembly is shown and generally indicated at reference 234. Hitch frame assembly 234 may be substantially similar to hitch frame assembly 34 in that it may generally include a hitch frame 236 and a king pin assembly 238; however, with a few noted differences, as will now be discussed.

Hitch frame 236 may have a front end 240 spaced apart from a back end 42 defining longitudinal direction therebetween which may be substantially parallel to the direction of travel of trailer 14. Hitch frame 236 may likewise have a left side 244 and right side 246 spaced transversely apart and a top side 248 spaced apart from a bottom side 250. Where hitch frame 236 may differ from hitch frame 36 is in that hitch frame 236 may have a forward cross member 274 but in place of a rear cross member 76, hitch frame 236 may include a plurality of cross members indicated at 360. As shown and described herein, cross members 360 may be labeled from front end 240 to back end 244 as 360A, 360B and 360C based on the order in which they are encountered when moving rearward from forward cross member 274. Hitch frame 236 may further differ in that bottom shelf 268 may be continuous and extend transversely across hitch frame 236 thereby connecting first side member 252 and second side member 254 and forming a generally continuous and/or single piece unit. Similarly, according to one aspect, forward cross member 274 may be integrally formed with bottom shelf 268 in that forward cross member 274 may be an extension thereof that may be bent or angled to provide vertical portion 278 for the purposes of wind and debris deflection as discussed with reference to front cross member 74.

King pin assembly 238 may differ significantly from king pin assembly 38 in that king pin assembly 238 may generally include a support structure 362 having a central beam 364 extending longitudinally within hitch frame 236. Central beam 364 may have one or more sidewalls 366 which may extend generally downward therefrom and may be formed as part of central beam 364. Central beam 364 may further include a base 368 which may provide a mounting surface to secure support structure 362 to bottom shelf 268. Support structure 362 may further include a plurality of king pin apertures 370 defined therethrough and corresponding to shelf apertures 269 (best seen in FIG. 15) defined through bottom shelf 268. King pin assembly 238 may further include a removable or detachable king pin 284 which may slidably engage with shelf and king pin apertures 269 and 370 as discussed further with regards to the operation of hitch frame assembly 234 below.

King pin 284 may include a body 350 having a top 352 and a bottom 354 spaced vertically apart therefrom. King pin 284 may further include collars 356 with a first collar 356A spaced above a second collar 356B. The body 350 and collars 356 may provide king pin 284 with the proper size, shape, and configuration for operable attachment to fifth wheel hitch 16. First collar 356A may further serve as a stop point or interface to prevent king pin 284 from being inserted too far into shelf apertures 269 and king pin apertures 370.

As with hitch frame assembly 34, hitch frame assembly 234 and the components thereof may be constructed of any suitable materials including, but not limited to, steel, aluminum or the like. Further, the elements and components of hitch frame assembly 234 may be assembled using any suitable attachment means including, but not limited to, bolts, rivets, screws, welds, or the like. Similarly, hitch frame assembly 34 may be securely attached to frame 24 of trailer 14 via any suitable attachment mechanism, again including, but not limited to, bolts, screws, rivets, welds, or the like.

Again, as with hitch frame assembly 34, a trailer 14 with hitch frame assembly 234 installed may be utilized with multiple different sized trucks without the need to add, remove, or otherwise adjust the cargo or weight of the trailer 14. For example, in the event of a road side breakdown, a new truck 12 could be brought in and connected to trailer 14 regardless of the differences in truck 12 size and/or configuration. In such an instance, the cargo within trailer 14 can continue to its destination with the closest or first available truck 12, without having to delay while waiting for an identically sized and configured truck 12 to arrive or without having to adjust the cargo in the trailer to accommodate another truck 12. Instead, the king pin 84 positon may be adjusted, and the new truck 12 may connect to the trailer 14 and drive on.

With continued reference to FIGS. 13-19, and with particular reference to FIG. 19, the operation of hitch frame assembly 34 will now be described. As with king pin 84 of hitch frame assembly 34, the position of king pin 284 may be movable to a plurality of positions along the longitudinal length of hitch frame assembly 234 to provide maximum payload capacity and efficiency with trailer 14 and truck 12. The same advantages as discussed with reference to hitch frame assembly 34 may be realized by the movable king pin 284 provided with hitch frame assembly 234.

Figure 19:
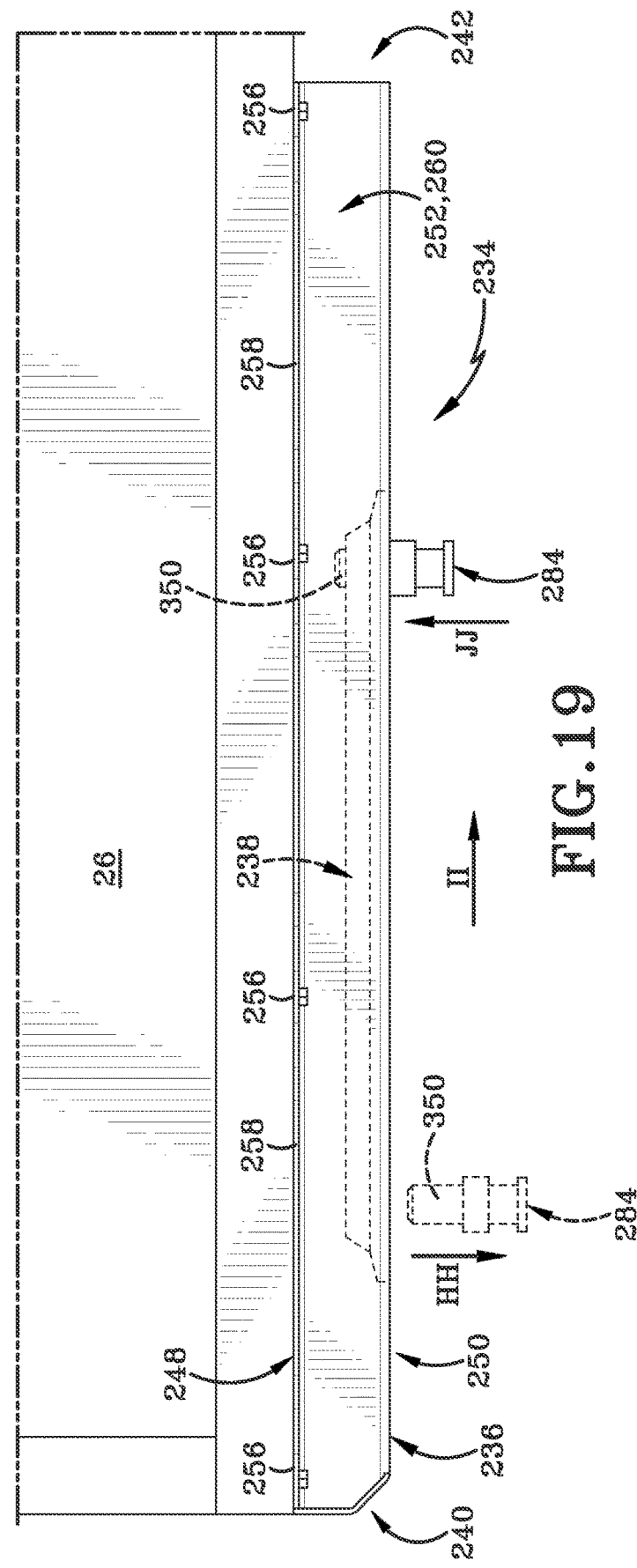
FIG. 19 is a side elevation operational view of the second embodiment of a hitch frame assembly according to one aspect of the present disclosure.

As shown in FIG. 19, the movement of king pin 284 may involve first removing king pin 284 from a first position by moving it downwards in the direction of arrow HH to disengage king pin 284 from king pin apertures 370 and support structure 362. King pin 284 may then be moved longitudinally, for example, in the direction of arrow II before reinserting king pin 284 into a different king pin aperture 370, such as indicated at arrow JJ. This process may be performed manually or may be modified to include one or more motorized or mechanized means to move king pin 284 between a first position wherein king pin 284 occupies one of the king pin apertures 370, and a second position wherein king pin 284 occupies another of the king pin apertures 370.

Although shown having a slidable engagement within king pin apertures 370, body 350 of king pin 284 may be modified for a more secure or different engagement-type to provide additional security for king pin 284 as dictated by the desired implementation. According to one aspect, king pin 284 may threadably engage king pin apertures, or may include one or more securing mechanisms such as a cotter pin, a lock clip, or the like to secure king pin 284 within king pin apertures 370 as necessary and as dictated by the desired implementation thereof. According to another aspect, king pin 284 may be removed from trailer 14 when trailer 14 is disengaged from truck 12 and supported by trailer support mechanism 32 to provide additional security to trailer 14 as the removal of king pin 284 can prevent a coupled attachment to a fifth wheel hitch 16 until such time as king pin 284 is replaced within king pin apertures 370.

Again, as discussed with reference to hitch frame assembly 34, the hitch frame assembly 234, or more particularly, the movable king pin 284 thereof, may provide the ability to shift the weight distribution of trailer 14 and any associated cargo therein forwards or backwards to increase or decrease the load on any particular axle 20 of truck 12 or axles 30 of trailer 14 as desired. This may again allow for a single trailer 14 to be adjusted to maximize the efficiency and cargo capacity of any sized and configured truck 12 that may be employed with trailer 14.

Although shown as a second embodiment, the hitch frame assembly 234 described herein may be modified in multiple ways, including the size, shape, and/or configuration thereof provided a plurality of king pin apertures 370 are present and aligned longitudinally to allow the forward to backward adjustment of king pin 284 as described herein. Accordingly, it will be understood that the figures shown and described herein are contemplated to be a representative example and not a limiting example thereof.

Figure 20:
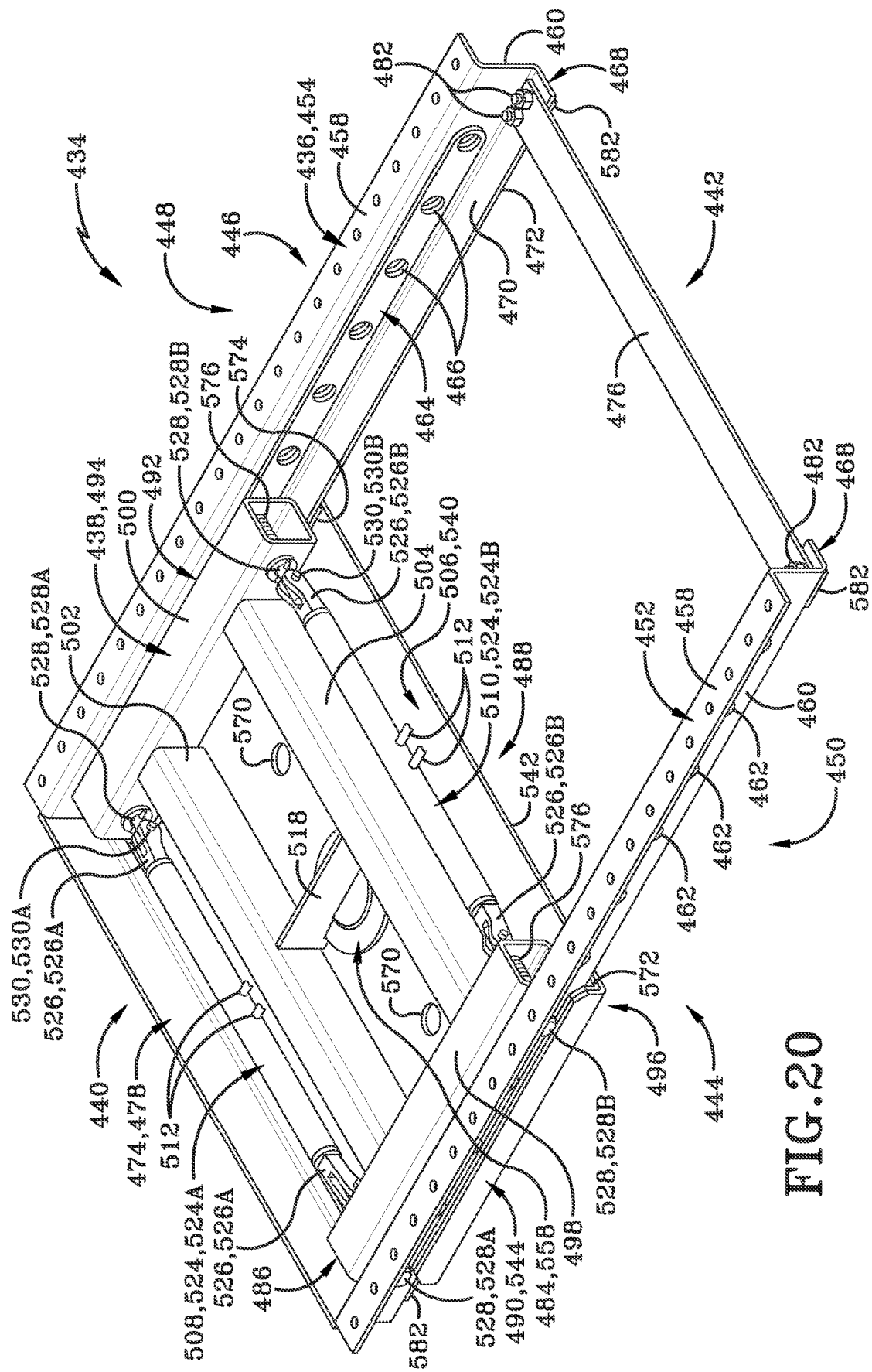
FIG. 20 is a top isometric view of a third embodiment of a hitch frame assembly according to one aspect of the present disclosure.

With reference generally to FIGS. 20-27, a third embodiment of a hitch frame assembly 434 is shown and will now be described. With particular reference to FIGS. 20-20B, hitch frame assembly 434 may be substantially similar to hitch frame assembly 34 (and hitch frame assembly 234 in some aspects, as discussed herein) in that it may generally include a hitch frame 436 and a king pin assembly 438; however, with a few noted differences, as will now be discussed.

Specifically, the king pin assembly 438 of hitch frame assembly 434 may modified to include air bag piston assemblies 508 and 510 in place of lock pin assemblies 108 and 110. This embodiment may further allow for elimination and/or replacement of the cams 124, camshaft/rod 118, hydraulic cylinder 114 and actuator 112, and other components which may likewise be eliminated, modified, or replaced, as discussed below. These modifications may facilitate a reduction in weight, cost, and/or maintenance of king pin assembly 438, as discussed herein.

Figure 20A:
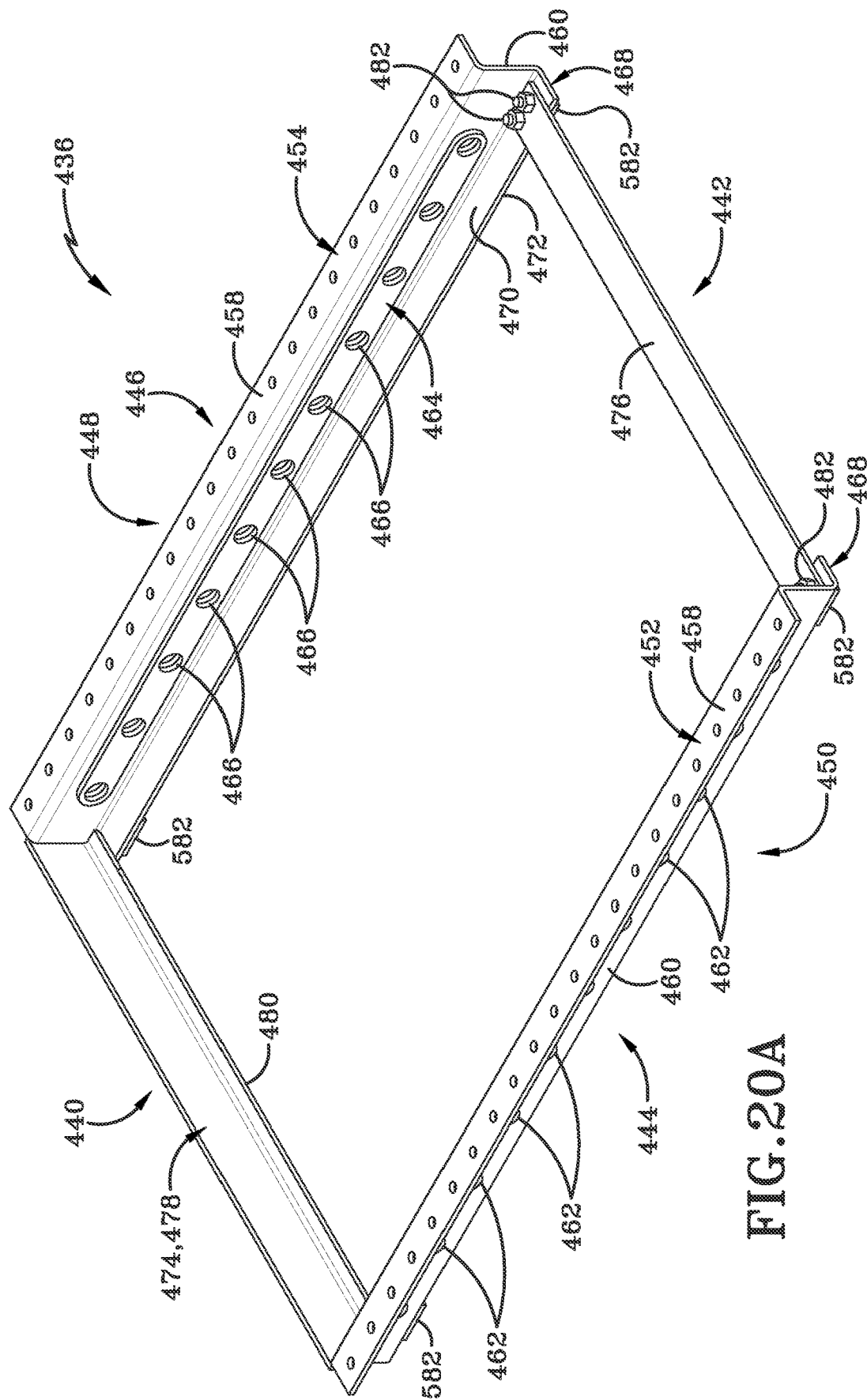
FIG. 20A is a top isometric view of the third embodiment of a hitch frame according to one aspect of the present disclosure.
Figure 20B:
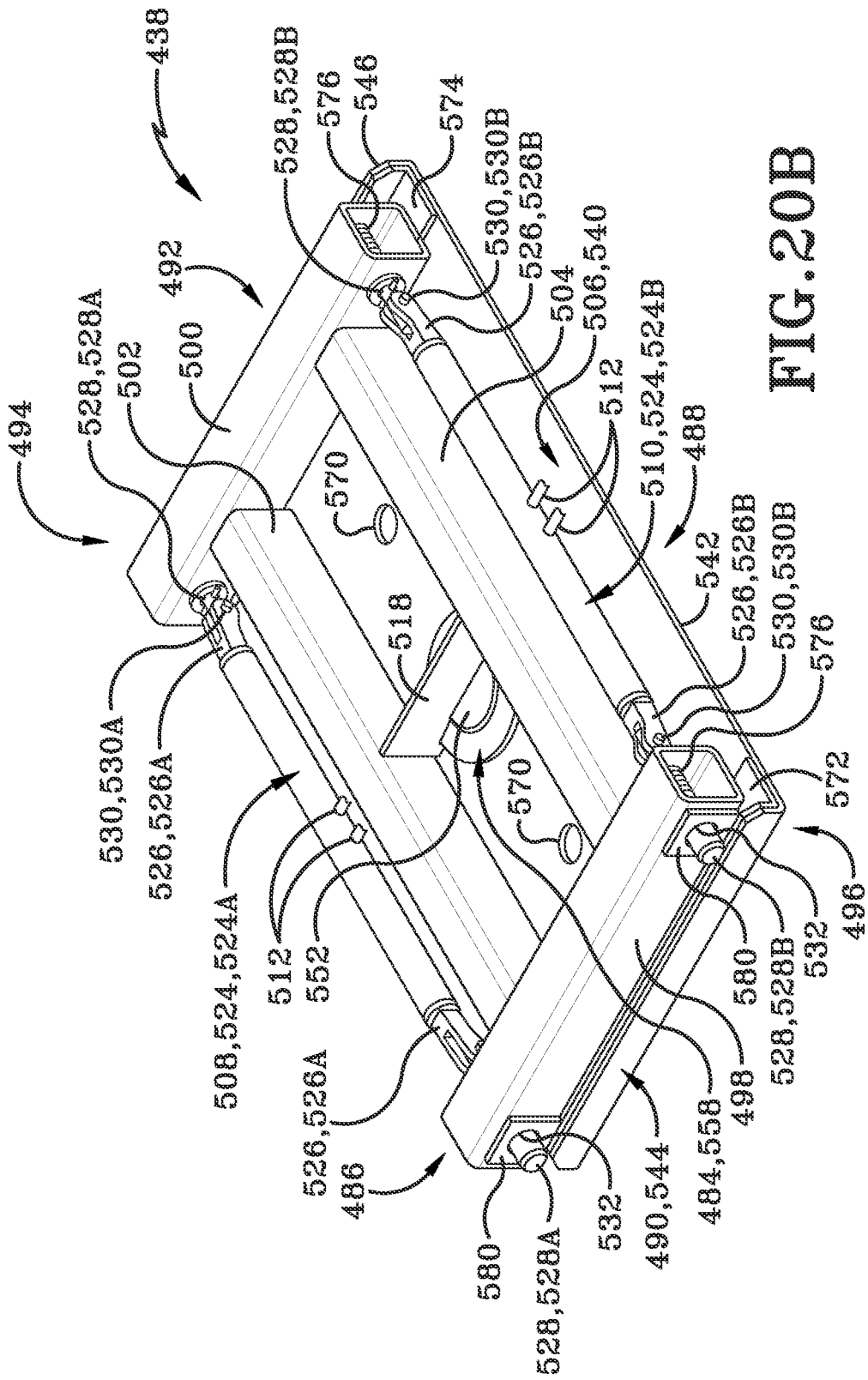
FIG. 20B is a top isometric view of the third embodiment of a king pin assembly according to one aspect of the present disclosure.

With reference to FIGS. 20 and 20A, hitch frame 436 may have a front end 440 spaced apart from a back end 442 and defining a longitudinal direction therebetween. This longitudinal direction may be generally defined as the direction of travel for trailer 14 and may be substantially parallel to Axis A (as indicated best in FIG. 2—discussed previously herein). Hitch frame 436 may further include a left side 444 spaced apart from a right side 446 and defining a transverse direction therebetween which may be substantially perpendicular to the direction of travel of trailer 14. Hitch frame 436 may have a top side 448 spaced apart from a bottom side 450 defining a vertical direction therebetween.

As with hitch frames 36 and 236, hitch frame 436 may be generally rectangular and may have a first side member 452 which may define the left side 444 and a second side member 454 which may define the right side 446 of frame 436. Each of first and second side members 52 and 54 may be substantially similar or identical but for their placement and orientation within hitch frame 436. According to one aspect, first side member 452 may be a mirror image of second side member 454.

Hitch frame 436 may differ in that hitch frame 436 may omit mounting flanges 56 from each of first and second side members 452 and 454 may instead utilize lip 458 as a mounting surface to engage hitch frame 436 to trailer 14. Lips 458 may therefore define the top side 448 of hitch frame 436 and may specifically facilitate attachment of hitch frame 436 to frame 24 of trailer 14. Hitch frame 436 may be attached to frame 24 through any suitable means including, but not limited to, bolts, screws, rivets, welds, or the like. Alternatively, according to one aspect, hitch frame 436 may be formed as part of trailer frame 24 as dictated by the desired implementation. Although shown and described as such, it will be understood that first and second side members 452 and 454 may include mounting flanges, or any other suitable structures to facilitate and support attachment to the frame 24 of trailer 14, as dictated by the desired implementation.

Other than the omission of mounting flanges 56 from hitch frame 436, as discussed above, hitch frame 436 may further differ from frame 36 in the inclusion of one or more stop plates 582 which may engage support brackets 572 and 574 of king pin assembly 438 to limit the longitudinal movement of king pin assembly 438 within hitch frame 436, as discussed further below. As best seen in FIG. 20A, these stops 582 may be located on a bottom surface 472 of shelf 468 towards the forward end 440 and rearward end 442 of side members 452 and 454. Alternatively, these stops 482 may be placed in any suitable or desired location to define the travel limits of king pin assembly 438 relative to hitch frame 436, as discussed below.

Other than these expressed differences, hitch frame 436 may be substantially similar or substantially identical to hitch frame 36.

With reference to FIGS. 20 and 20B, king pin assembly 438 is shown and will now be discussed in further detail. As with king pin assembly 38, king pin assembly 438 is understood as the assembly carrying king pin 484 and may have a front end 486 spaced apart from a back end 88 defining therebetween a longitudinal direction. Front end 486 and back end 488 of king pin assembly 438 may generally correspond to front end 440 and back end 442 of hitch frame 436. King pin assembly 438 may have a left side 490 corresponding to left side 444 of hitch frame 436 and may be spaced apart from a right side 492 corresponding to right side 446 of hitch frame assembly 436. The left side 490 and right side 492 of king pin assembly 438 may likewise define a transverse direction therebetween. King pin assembly 438 may have a top side 494 spaced apart from a bottom side 496 defining the vertical direction therebetween and generally corresponding to top side 448 and bottom side 450 of hitch frame 436.

King pin assembly 438 may also include a first side member 498 and a second side member 500 which may be longitudinal side members corresponding to left and right sides 490 and 492, respectively. King pin assembly 438 may further include a first cross member 502 and a second cross member 504 extending transversely with first cross member 502 generally positioned towards front end 486 of king pin assembly 438 and second cross member 504 generally positioned towards the back end 488. King pin assembly 438 may further include a base plate 506 which may extend beneath first and second side members 498, 500 and first and second cross members 502, 504 and may further support other components of king pin assembly 438 as discussed further below. Side members 498 and 500 may include a spacer 580 (best seen in FIG. 24) attached to an exterior surface thereof between the rails 464 of hitch frame 436 and the exterior sides of side members 498 and 500 that are farthest from the centerline of king pin assembly 438. These spacers 580 may be of any suitable material and may be operable to provide a tighter tolerance between adjacent components to prevent unwanted movement therebetween, for example, rattling from an uneven road surface. According to one aspect, spacers 580 may be constructed of a material with a low friction coefficient to further facilitate the slidable engagement of king pin assembly 438 with hitch frame 436, as discussed herein.

King pin assembly 438 may differ from king pin assembly 38 in that front and rear lock pin assemblies 108 and 110 may be replaced by front and rear air bag assemblies 508 and 510, respectively. King pin assembly 438 may further omit piston 112 and hydraulic cylinder 114 as well as mounting plate 116. Instead, king pin assembly 438 may include a pneumatic system and/or pneumatic hoses 512 to direct air into and/or out of air bags 524, as discussed below. Similarly, longitudinal rod 118, rod mount 119, and stop member 120 may be omitted from king pin assembly 438. King pin assembly 438 may include a longitudinal support member 518, which may be centrally located between cross members 502 and 504 and may generally define the centerline of king pin assembly 438 (which would generally coincide with Axis A in FIG. 2). According to another aspect, longitudinal support member 518 may be located in any suitable position, or may be omitted according to the desired implementation.

Each of front and rear air bag assemblies 508 and 510 may be substantially similar or identical to each other but for their placement within king pin assembly 438 such that front air bag assembly 508 may be the assembly most near the front end 486 of king pin assembly 438 while rear air bag assembly 510 may be the assembly most near the back end 488 thereof. Each of front and rear air bag assemblies 508 and 510 may include the pneumatic hoses 112, as discussed above, at least one air bag 524 at least one pin linkage arm 526, and at least one lock pin 528. As shown and described, it is contemplated that each air bag assembly 508 and 510 may include an air bag 524, two pin linkage arms 526 and two lock pins 528, with one linkage arm 526 and one lock pin 528 disposed to either side of the air bag 524.

As indicated in FIG. 20B and generally shown throughout FIGS. 20-27, the components of air bag assemblies 508 and 510 may be substantially identical; however, they may be identified with the designation 'A' for front air bag assembly 508 and 'B' for rear air bag assembly 510. For example, air bag 124A may be the air bag for front air bag assembly 508 while air bag 524B may be the air bag of rear air bag assembly 510. Therefore, it will be understood that references to the components of air bag assemblies 508 and 510, having a reference number without this 'A' or 'B' designation, are understood to refer generally to either air bag assembly 508 and 510 while references including the 'A' or 'B' designation may refer specifically to those specific components.

Air bag assemblies 508 and 510 may further include one or more pin linkage arms 526 which may connect air bags 524 to lock pins 528, respectively. Pin linkage arms 526 may be pivotally connected to air bag 524 and to lock pins 528 via one or more pivot pins 530. As discussed further below with reference to the operation thereof, pivot pins 530 may allow pivotal movement to drive lock pins 528 in and out of lock pin apertures 532 formed through first and second side members 498 and 500. According to one aspect, lock pin apertures 532 may include a bushing 534 or the like to support and/or facilitate movement of lock pins 528 therein.

As best seen in FIG. 24, lock pins 528 may be biased into an extended position by springs 576 which may be contained within side members 498 and 500 of king pin assembly 438. This placement may allow for springs 576 to interact with the inside surfaces of side members 498 and 500 to provide the biasing force to lock pins 528 to keep the pins extended. Springs 576 may further assist air bags 524 in rebounding to their relaxed state, as discussed further below.

Lock pins 528 may each further include a stop pin 578 extending therethrough which may interact with an outer surface of side members 498 and 500 to prevent lock pin from extending beyond the desired position in lock pin apertures 532. Thus, the movement of lock pins 528 are limited by the inflation limit of air bags 524 as lock pins 528 move towards the centerline of king pin assembly 438 and by stop pins 578 as lock pins 528 move away from the centerline.

As discussed previously herein, longitudinal support member 518 may extend longitudinally between cross members 502 and 504 and may be fixedly connected thereto to provide additional support and structural rigidity to king pin assembly 438.

Figure 21:
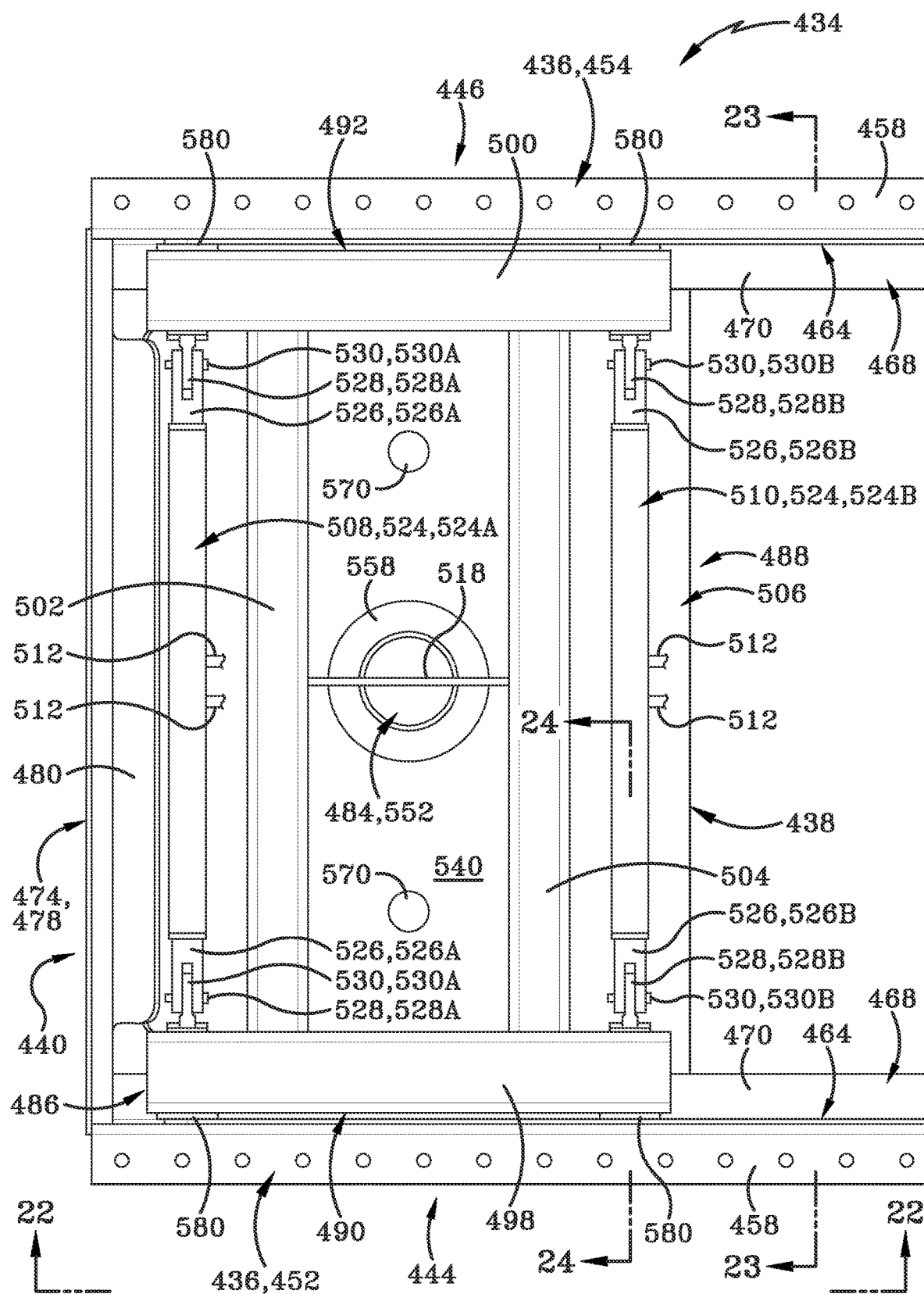
FIG. 21 is a partial top plan view of the third embodiment of a hitch frame assembly according to one aspect of the present disclosure.

As best seen in FIGS. 20B and 21, base plate 506 may extend longitudinally from front end 486 to back end 488 and transversely from the exterior of first side member 498 beyond the exterior of second side member 500. Base plate 506 may be generally U-shaped (when viewed from front or back end 486 or 488) and may have a top face 540 and a bottom face 542 vertically opposite thereto. Base plate 506 may further have a first side flange 544 which may bend generally upwards and extend vertically exterior (i.e. away from Axis A and the imaginary centerline of hitch frame assembly 434) of first side member 498 and a second side flange 546 which may extend vertically and exterior of second side member 500. The side flanges 544 and 546 may be spaced slightly apart (as best seen in FIGS. 23 and 24) from side members 498 and 500 to allow slidable passage of sidewalls 460 of first and second side members 452 and 454 of hitch frame 436 therebetween, as discussed below.

Base plate 506 may be attached to forward and rear cross members 502 and 504 while side members 498 and 500 may be spaced slightly above base plate 506. The space between base plate 506, side flanges 544 and 546, and side members 498 and 500 is best seen in FIGS. 23 and 24. As mentioned previously, this spacing may permit slidable passage of first and second side members 452 and 454 of hitch frame 436 therethrough. More particularly, this space may permit sidewalls 460 and bottom shelf 468 to pass between side members 498 and 500 and base plate 506 of king pin assembly 438. The outermost portions of base plate 506 nearest side flanges 544 and 546 may further include an L-shaped support bracket 572 and 574 respectively. These support brackets 572 and 574 may be made of any suitable material, including metal, polymers, or the like, and may support hitch frame 436 side members 452 and 454 against base plate 506. The support brackets 572 and 574 are best seen in FIGS. 23 and 24. Base plate 506 may further include one or more drain apertures 570 which may be strategically placed to permit water or debris to pass therethrough.

According to one aspect, base plate 506 may serve as a mounting plate for various components of king pin assembly 438 while further functioning to deflect debris that may come from the road on which the truck 12 and trailer 14 are being operated.

Figure 22:
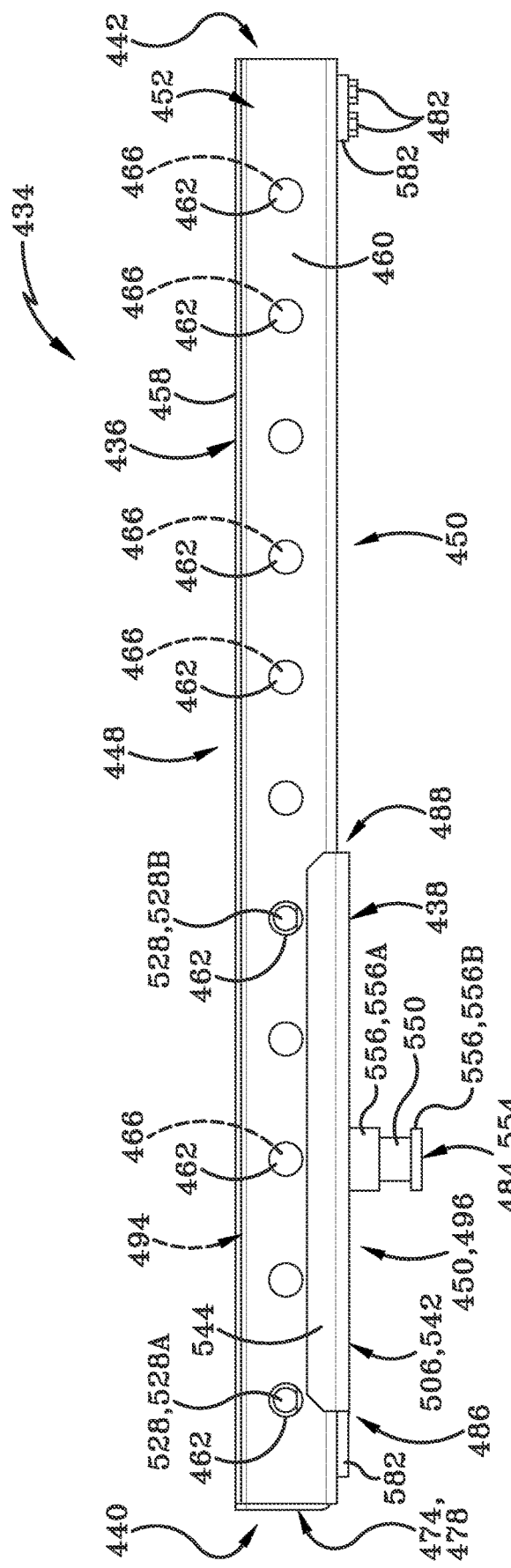
FIG. 22 is a left side elevation view of the third embodiment of a hitch frame assembly looking in the direction of the line indicated in FIG. 21 according to one aspect of the present disclosure.

With continued reference to FIGS. 20-27 but as best seen in FIGS. 21 and 22, king pin assembly 438 may further include king pin 484 which may extend downwardly therefrom. More particularly, king pin 484 may extend through a king pin aperture 548 defined in base plate 506 and may further have a body 550 having a top 552 spaced vertically apart from a bottom 554. The body 550 of king pin 484 may further include a pair of collars 556 with an upper collar 556A spaced vertically apart from a lower collar 556B to form the proper configuration for operable attachment to a standard fifth wheel hitch, such as fifth wheel hitch 16. King pin 484 may be removably or permanently affixed to base plate 506 via a flange 558 which may extend above base plate 506 to provide an attachment surface thereto. According to one aspect, king pin 484 may be bolted, welded, riveted, or attached through any other suitable attachment means.

The components and elements of king pin assembly 438, similarly to hitch frame 436, may be formed of any suitable material again with the understanding of the expected use and implementation thereof. According to one aspect, king pin assembly 438 and the components thereof may be constructed of steel or other suitable metal. According to another aspect, king pin assembly 438 may include anti-friction coatings or materials to promote and facilitate the slidable engagement between king pin assembly 438 and hitch frame 436, as discussed further herein.

Having thus described the elements and components of a first embodiment of hitch frame assembly 434, including hitch frame 436 and king pin assembly 438, the slidable engagement and operation thereof will now be discussed.

Figure 27:
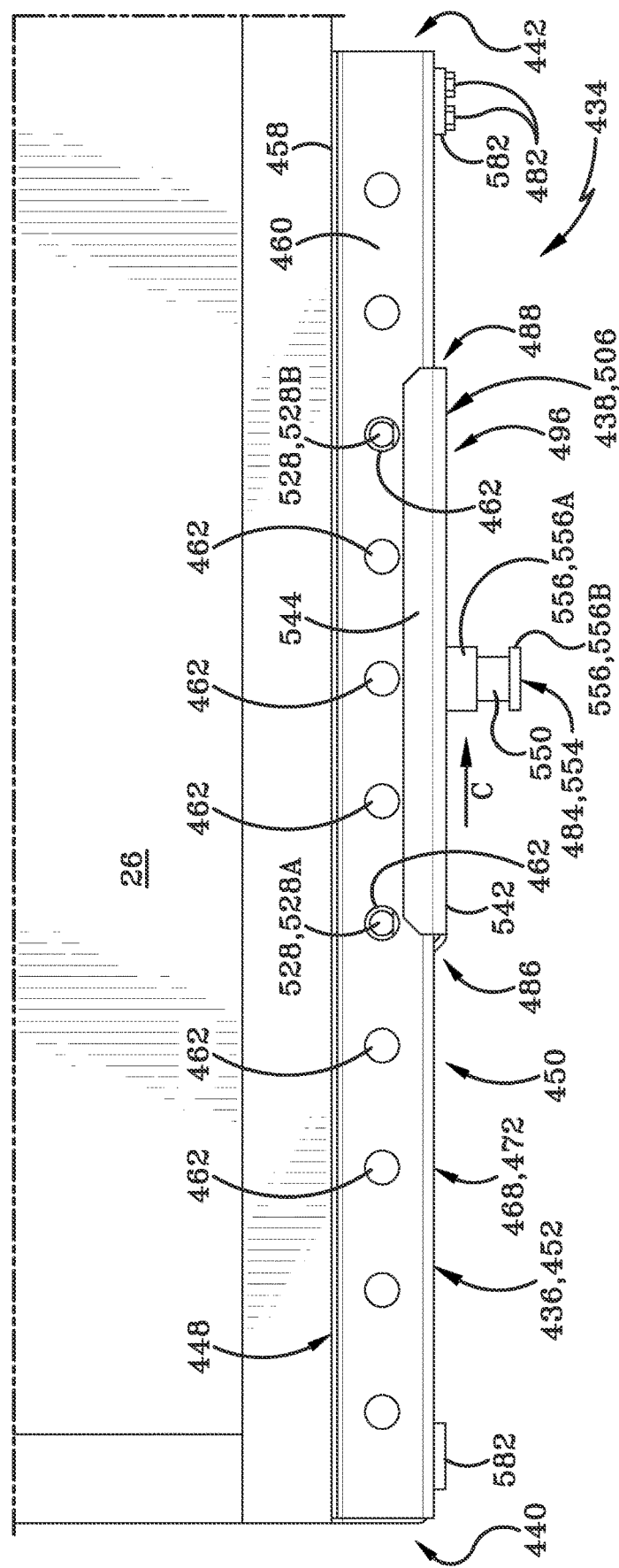
FIG. 27 is a side elevation operational view of the third embodiment of a hitch frame assembly according to one aspect of the present disclosure.

With reference to FIGS. 25-27, the operation and assembly of hitch frame assembly 434 will be discussed in more detail. As described above with reference to hitch frame assembly 34, the king pin assembly 438 may be slidably engaged with hitch frame 436 in much the same way, with the most notable differences being in the manner in which the lock pins 528 are engaged with and/or disengaged from apertures 462 of hitch frame 436. Accordingly, king pin assembly 438 and king pin 484 may be movable to a plurality of positions along the longitudinal length of hitch frame assembly 434 to provide maximum payload capacity and efficiency with trailer 14 and truck 12. The same advantages as discussed with reference to hitch frame assemblies 34 and 234 may be realized by the movable king pin assembly 438 provided with hitch frame assembly 434.

Again, as with hitch frame assembly 34, a trailer 14 with hitch frame assembly 434 installed may be utilized with multiple different sized trucks without the need to add, remove, or otherwise adjust the cargo or weight of the trailer 14. For example, in the event of a road side breakdown, a new truck 12 could be brought in and connected to trailer 14 regardless of the differences in truck 12 size and/or configuration. In such an instance, the cargo within trailer 14 can continue to its destination with the closest or first available truck 12, without having to delay while waiting for an identically sized and configured truck 12 to arrive or without having to adjust the cargo in the trailer to accommodate another truck 12. Instead, the king pin assembly 438 positon may be adjusted, and the new truck 12 may connect to the trailer 14 and drive on.

Having thus described the assembly and purpose of hitch frame assembly 434, the mechanism of operation therefore will now for be discussed.

With continued reference to FIGS. 25-27, king pin assembly 438 may be slidable or moveable within hitch frame 436 when lock pins 528 are in a retracted position, as seen in FIG. 26. To move lock pins 528 from an engaged or extended position (as in FIG. 25) to a disengaged or retracted position (as in FIG. 26), the air bags 524 may be activated and may be inflated with air entering though feed lines 512, thus causing air bags 524 to expand in the direction of arrows A, indicated in FIGS. 25-26. The inflation of air bags 524 increases the girth thereof while simultaneously shortening the transverse length thereof, thus drawing pin linkage arms 526 and the lock pins 528 in the direction of arrows B in FIGS. 25 and 26, and towards the centerline of king pin assembly 438. This movement is against the biasing force of springs 576, causing them to compress. When air bags 524 are fully inflated, lock pins 528 may be disengaged from hitch frame apertures 462 and king pin assembly 438 may be slid longitudinally relative to hitch frame 436. According to one example, as illustrated in FIG. 27, king pin assembly 438 may be longitudinally slid in the direction of arrow C to a new position within hitch frame 436.

Once king pin assembly 438 is in the desired position within hitch frame 346 and lock pins 528 are aligned with the appropriate apertures 462 in hitch frame 436, the pressure within air bags 524 may be released, allowing air bags 524 to deflate and return to their original state. As air bags 524 deflate, springs 576 may again expand to further facilitate the movement of lock pins 528 back into engagement with the hitch frame 436 to secure king pin assembly 438 into the new position.

Although the transverse motion of lock pins 528 is described as shown in the figures, it will be understood that king pin assembly 438, air bag assemblies 508 and 510, and any components thereof may be modified and the mechanism of movement of lock pins 528 between the engaged or extended position and the disengaged or retracted position may be accomplished through other means.

Although described herein utilizing pneumatic or air-powered systems, it will be understood that air bag assemblies 508 and 510 may be operated using any suitable system or method including, but not limited to, hydraulic systems, or the like. According to the aspect described herein, air bag assemblies 508 and 510 may be air-powered as it is common for truck 12 and trailer 14 to include other air-powered components, thereby providing quick and easy access to a pneumatic system; however, other methods of inflating and deflating air bags 524 may be readily employed herein. Accordingly, it will be understood that hitch frame assembly 434 may include any additional and/or necessary connectors or components including, but not limited to, additional hoses, electrical connections, or the like for proper operation of air bag assemblies 508 and 510. It will be further understood that the longitudinal and slidable engagement of king pin assembly 438 within hitch frame 436 may be adjusted manually or through mechanical means, and/or automated means as dictated by the desired implementation thereof.

It will therefore be understood that this third embodiment of hitch frame assembly 434 may operate substantially similar to the first and/or second embodiments of hitch frame assemblies 34 and 234, as discussed herein, but for the replacement and modifications to king pin assembly 434 as discussed above. It will be further understood that the third embodiment is a non-limiting example of an alternative mechanism by which the lock pins 528 may be extended or retracted to allow for movement of king pin assembly 438 relative to mount frame 434, and that other similar mechanisms to move the lock pins 528 may be readily employed and may be included in the scope herein.

Again, as discussed with reference to hitch frame assemblies 34 and 234, the hitch frame assembly 434, or more particularly, the movable king pin assembly 438 and king pin 484 thereof, may provide the ability to shift the weight distribution of trailer 14 and any associated cargo therein forwards or backwards to increase or decrease the load on any particular axle 20 of truck 12 or axles 30 of trailer 14 as desired. This may again allow for a single trailer 14 to be adjusted to maximize the efficiency and cargo capacity of any sized and configured truck 12 that may be employed with trailer 14.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A trailer hitch assembly comprising:
   a hitch frame, wherein the hitch frame comprises a first side member, a second side member, and a plurality of apertures defined in the first and second side members, wherein the plurality of apertures in the first side member are opposite and aligned with the plurality of apertures in the second side member and further define opposing pairs of apertures;
   a king pin assembly slidably engaged with the hitch frame;
   a king pin carried by the king pin assembly that is longitudinally moveable relative to the hitch frame via the slidable engagement of the king pin assembly and the hitch frame;
   a first lock pin assembly carried by the king pin assembly having a first pair of lock pins operable to engage a first set of opposing pairs of apertures, wherein one of the first pair of lock pins is operable to engage apertures in the first side rail and the other of the first pair of lock pins is operable to engage apertures in the second side rail;
   a first air bag assembly operably engaged with the first pair of lock pins to disengage the first pair of lock pins from the first set of opposing pairs of apertures in the hitch frame;
   a second lock pin assembly carried by the king pin assembly having a second pair of lock pins operable to engage a second set of opposing pairs of apertures, wherein one of the second pair of lock pins is operable to engage apertures in the first side rail and the other of the second pair of lock pins is operable to engage apertures in the second side rail; and
   a second air bag assembly operably engaged with the second pair of lock pins to disengage the second pair of lock pins from the second set of opposing pairs of apertures in the hitch frame.

2. The hitch assembly of claim 1, wherein the king pin assembly further comprises:
   at least one pneumatic hose operably engaged with a first air bag of the first air bag assembly to inflate and deflate the first air bag; and
   at least one pneumatic hose operably engaged with a second air bag of the second air bag assembly to inflate and deflate the first air bag.

3. The hitch assembly of claim 1, wherein the king pin assembly further comprises:
   a plurality of biasing springs with at least one spring thereof operably engaged with lock pin of the first and second pair of lock pins operable to bias the first and second pair of lock pins into an engaged position with the apertures of the hitch frame.

4. The hitch assembly of claim 1, wherein a first opposing pair of apertures defines a first position and a second pair of apertures defines a second position in which the king pin assembly is securable within the hitch frame.

5. The hitch assembly of claim 4 wherein the trailer is connected to a first truck having a first weight when the king pin assembly is in the first position and a second truck having a second weight when the king pin is in the second position.

6. The hitch assembly of claim 5 wherein the first weight of the first truck is less than the second weight of the second truck.

7. The hitch assembly of claim 6 wherein a greater portion of the weight of the trailer and a cargo load carried by the trailer is distributed forward onto at least one axle of the first truck when the king pin assembly is connected to the first truck in the first position and wherein a greater portion of the weight of the trailer and cargo load is distributed rearward onto at least one axle of the trailer when the king pin assembly is connected to the second truck in the second position.

8. A method of adjusting the position of a king pin location on a trailer comprising:
   inflating an air bag to retract a lock pin carried by a king pin assembly to disengage the lock pin from a first aperture defined in an associated hitch frame;
   moving the king pin assembly from a first position within the hitch frame defined by the first aperture to a second position within the hitch frame defined by a second aperture defined in the hitch frame; and
   deflating the air bag to extend the lock pin to engage the lock pin with the second aperture.

9. The method of claim 8 further comprising:
   connecting the trailer to a truck by engaging a king pin carried by the king pin assembly with a fifth wheel hitch carried by the truck.

10. The method of claim 9 wherein connecting the king pin to a truck further comprises:
    connecting the king pin to a first truck having a first weight when the king pin assembly is in the first position; and connecting the king pin to a second truck having a second weight when the king pin assembly is in the second position.

11. The method of claim 10 wherein a greater portion of the weight of the trailer and a cargo load carried by the trailer is distributed forward onto at least one axle of the first truck when the king pin assembly is connected to the first truck in the first position and wherein a greater portion of the weight of the trailer and cargo load is distributed rearward onto at least one axle of the trailer when the king pin assembly is connected to the second truck in the second position.

12. The method of claim 8 further comprising:
re-inflating the air bag to retract the lock pin to disengage the lock pin from the second aperture;
moving the king pin assembly from the second position to a third position within the hitch frame defined by a third aperture defined in the hitch frame; and
re-deflating the air bag to extend the lock pin to engage the lock pin with the third aperture.

13. The method of claim 8 wherein the hitch frame further comprises:
a first side member; and
a second side member, and wherein moving the king pin assembly within the hitch frame is accomplished by sliding the king pin assembly longitudinally between the first and second side members.

14. A trailer hitch assembly comprising:
a hitch frame, wherein the hitch frame comprises a first side member, a second side member, and a plurality of apertures defined in the first and second side members, wherein the plurality of apertures in the first side member are opposite and aligned with the plurality of apertures in the second side member and further define opposing pairs of apertures;
a king pin assembly slidably engaged with the hitch frame;
at least one lock pin assembly carried by the king pin assembly having at least one lock pin operable to engage at least one aperture defined in the hitch frame to secure the king pin assembly in position within the hitch frame, wherein the at least one lock pin assembly further comprises:
at least two lock pins operable to engage the opposing pairs of apertures, wherein at least one of the at least two lock pins is operable to engage apertures in the first side member and at least one other lock pin of the at least two lock pins is operable to engage apertures in the second side member;
a king pin carried by the king pin assembly that is longitudinally moveable relative to the hitch frame via the slidable engagement of the king pin assembly and the hitch frame;
at least one air bag assembly operably engaged with the at least two lock pins to disengage the at least two lock pins from the plurality of apertures defined in the first and second side members of the hitch frame;
wherein the king pin assembly further comprises:
a first pair of lock pins operable to engage a first set of opposing pairs of apertures, wherein one of the first pair of lock pins is operable to engage apertures in the first side rail and the other of the first pair of lock pins is operable to engage apertures in the second side rail;
a second pair of lock pins operable to engage a second set of opposing pairs of apertures, wherein one of the second pair of lock pins is operable to engage apertures in the first side rail and the other of the second pair of lock pins is operable to engage apertures in the second side rail;
a first air bag assembly operably engaged with the first pair of lock pins to disengage the first pair of lock pins from the first set of opposing pairs of apertures in the hitch frame; and
a second air bag assembly operably engaged with the second pair of lock pins to disengage the second pair of lock pins from the second set of opposing pairs of apertures in the hitch frame.

15. The hitch assembly of claim 14 wherein the king pin assembly further comprises:
at least one pneumatic hose operably engaged with a first air bag of the first air bag assembly to inflate and deflate the first air bag; and
at least one pneumatic hose operably engaged with a second air bag of the second air bag assembly to inflate and deflate the first air bag.

16. The hitch assembly of claim 14 wherein the king pin assembly further comprises:
a plurality of biasing springs with at least one spring thereof operably engaged with lock pin of the first and second pair of lock pins operable to bias the first and second pair of lock pins into an engaged position with the apertures of the hitch frame.

* * * * *